(12) United States Patent
Takai et al.

(10) Patent No.: US 11,138,173 B2
(45) Date of Patent: Oct. 5, 2021

(54) TABLE RELATION ANALYSIS ASSISTING APPARATUS AND TABLE RELATION ANALYSIS ASSISTING METHOD

(71) Applicant: HITACHI, LTD., Tokyo (JP)

(72) Inventors: Yasunari Takai, Tokyo (JP); Keishi Ooshima, Tokyo (JP); Katsumi Kawai, Tokyo (JP); Makoto Kimura, Tokyo (JP); Kiyoshi Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 394 days.

(21) Appl. No.: 16/129,130

(22) Filed: Sep. 12, 2018

(65) Prior Publication Data

US 2019/0095474 A1    Mar. 28, 2019

(30) Foreign Application Priority Data

Sep. 28, 2017  (JP) .............................. JP2017-188631

(51) Int. Cl.
   *G06F 16/00* (2019.01)
   *G06F 16/22* (2019.01)
   *G06F 16/248* (2019.01)
   *G06F 16/28* (2019.01)

(52) U.S. Cl.
   CPC ........ *G06F 16/2282* (2019.01); *G06F 16/221* (2019.01); *G06F 16/248* (2019.01); *G06F 16/284* (2019.01)

(58) Field of Classification Search
   CPC ............... G06F 16/2282; G06F 16/221; G06F 16/284; G06F 16/248; G06F 16/21; G06F 16/28; G06F 16/26

USPC ......................................................... 707/802
See application file for complete search history.

(56) References Cited

U.S. PATENT DOCUMENTS

| | | | |
|---|---|---|---|
| 2008/0046462 A1* | 2/2008 | Kaufman ............ | G06F 16/2423 |
| 2008/0256133 A1* | 10/2008 | Frankland .......... | G06Q 10/0631 |
| 2010/0030801 A1 | 2/2010 | Takayama et al. | |
| 2014/0180939 A1* | 6/2014 | Frankland ............. | G06Q 10/06 |
| | | | 705/317 |
| 2015/0244599 A1* | 8/2015 | Nagai ................... | G06F 11/079 |
| | | | 709/223 |

FOREIGN PATENT DOCUMENTS

JP    2010-039593 A    2/2010

* cited by examiner

*Primary Examiner* — Monica M Pyo
(74) *Attorney, Agent, or Firm* — Volpe Koenig

(57) ABSTRACT

A table relation analysis assisting apparatus analyzes a relation between pieces of data in a certain column (external key) astride tables in a relational database. The apparatus analyzes a relation between tables and holds inter-table relation analysis information in which tables, pieces of data in the tables being in a one to one relation or a plural to one relation, are defined as one table group. In the apparatus, an analysis result display unit provides a display in such a form that one or more tables in a relational database are contracted into a table group. The display unit displays table groups in such a form that which of a one to one relation or a plural to one relation a relation between pieces of data included therein is astride tables can be viewed.

8 Claims, 44 Drawing Sheets

FIG. 5
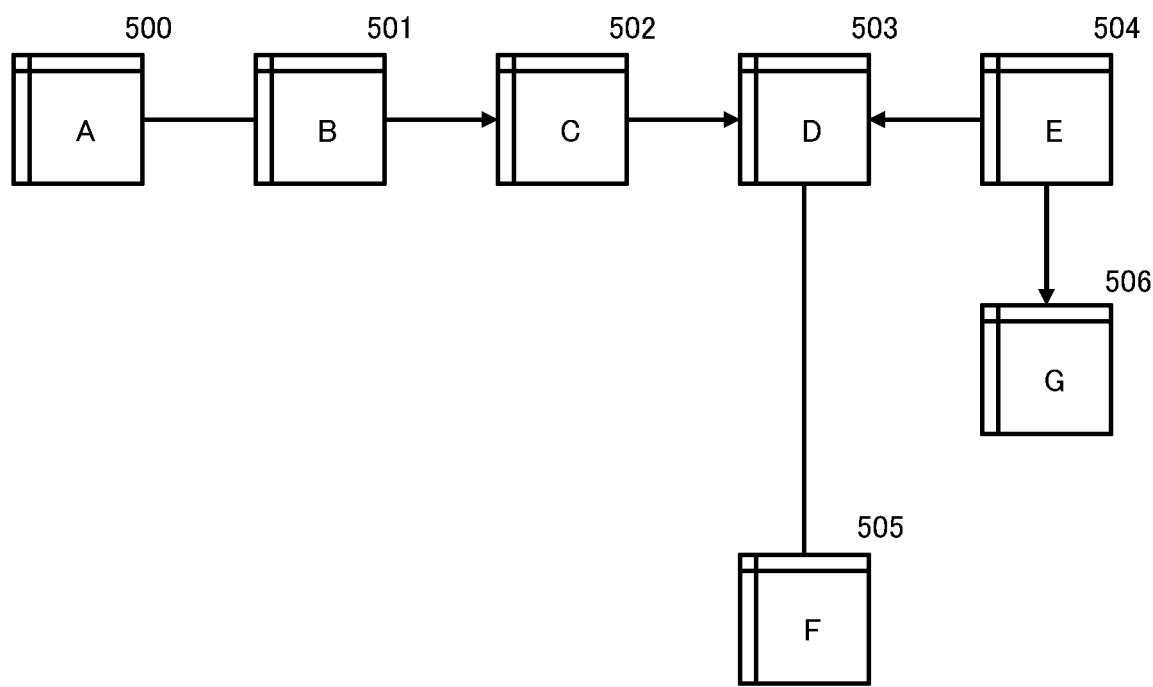
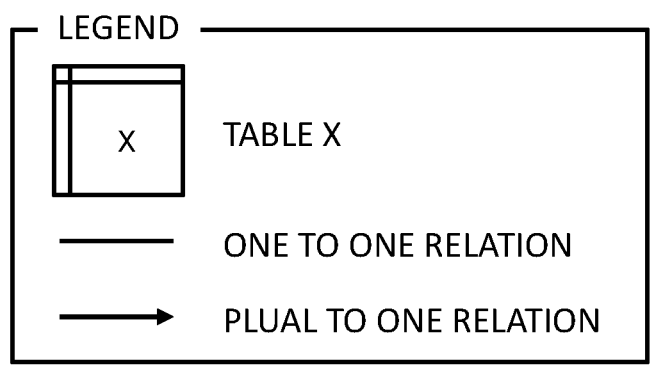

FIG. 6

INTER-TABLE GROUP RELATION TABLE    320

| ID | ORIGINAL TABLE GROUP | TARGET TABLE GROUP | RELATION |
|---|---|---|---|
| 1 | A | B | ONE TO ONE |
| 2 | B | A | ONE TO ONE |
| 3 | B | C | PLURAL TO ONE |
| 4 | C | B | ONE TO PLURAL |
| 5 | C | D | PLURAL TO ONE |
| 6 | D | C | ONE TO PLURAL |
| 7 | D | F | ONE TO ONE |
| 8 | F | D | ONE TO ONE |
| 9 | D | E | ONE TO PLURAL |
| 10 | E | D | PLURAL TO ONE |
| 11 | E | G | PLURAL TO ONE |
| 12 | G | E | ONE TO PLURAL |

FIG. 7

ALLOCATION TABLE  321

| ID (700) | TABLE GROUP (701) | ALLOCATION NUMBER (702) |
|---|---|---|
| 1 | A | |
| 2 | B | |
| 3 | C | |
| 4 | D | |
| 5 | E | |
| 6 | F | |
| 7 | G | |

FIG. 8

INTER-TABLE GROUP RELATION TABLE  320

| ID | ORIGINAL TABLE GROUP | TARGET TABLE GROUP | RELATION |
|---|---|---|---|
| ~~1~~ | ~~A-B~~ | ~~A-B~~ | ~~ONE TO ONE~~ |
| ~~2~~ | ~~A-B~~ | ~~A-B~~ | ~~ONE TO ONE~~ |
| 3 | A-B | C | PLURAL TO ONE |
| 4 | C | A-B | ONE TO PLURAL |
| 5 | C | D-F | PLURAL TO ONE |
| 6 | D-F | C | ONE TO PLURAL |
| ~~7~~ | ~~D-F~~ | ~~D-F~~ | ~~ONE TO ONE~~ |
| ~~8~~ | ~~D-F~~ | ~~D-F~~ | ~~ONE TO ONE~~ |
| 9 | D-F | E | ONE TO PLURAL |
| 10 | E | D-F | PLURAL TO ONE |
| 11 | E | G | PLURAL TO ONE |
| 12 | G | E | ONE TO PLURAL |

FIG. 9
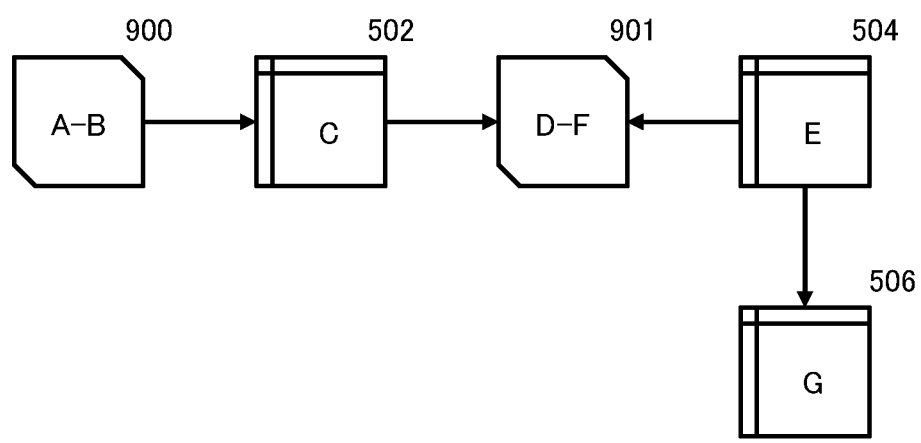
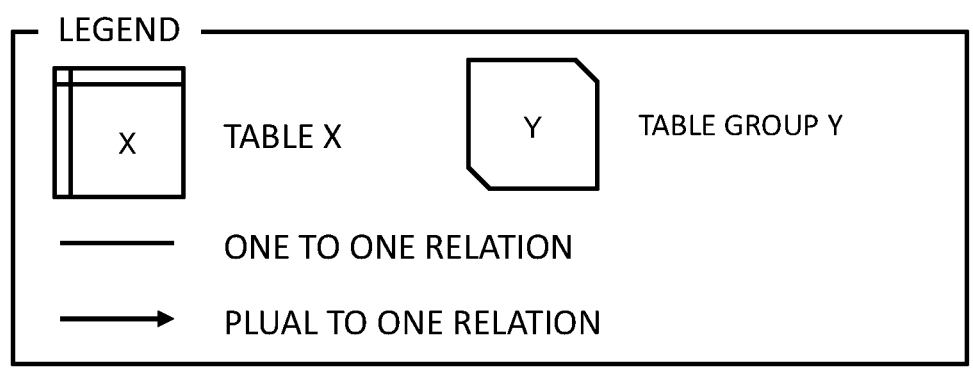

FIG. 10

INTER-TABLE GROUP RELATION TABLE 320

| ID | ORIGINAL TABLE GROUP | TARGET TABLE GROUP | RELATION |
|---|---|---|---|
| 3 | A-B | C | PLURAL TO ONE |
| 4 | C | A-B | ONE TO PLURAL |
| 5 | C | D-F | PLURAL TO ONE |
| 6 | D-F | C | ONE TO PLURAL |
| 9 | D-F | E | ONE TO PLURAL |
| 10 | E | D-F | PLURAL TO ONE |
| 11 | E | G | PLURAL TO ONE |
| 12 | G | E | ONE TO PLURAL |

ALLOCATION TABLE 321

| ID | TABLE GROUP | ALLOCATION NUMBER |
|---|---|---|
| 1 | A | 8 |
| 2 | B | 8 |
| 3 | C | |
| 4 | D | 9 |
| 5 | E | |
| 6 | F | 9 |
| 7 | G | |
| 8 | A-B | |
| 9 | D-F | |

FIG. 12

INTER-TABLE GROUP RELATION TABLE 320

| ID | ORIGINAL TABLE GROUP | TARGET TABLE GROUP | RELATION |
|---|---|---|---|
| 3 | A-B | C:D-F | PLURAL TO ONE |
| 4 | C:D-F | A-B | ONE TO PLURAL |
| 5 | C:D-F | D-F | PLURAL TO ONE |
| ~~6~~ | ~~D-F~~ | ~~C:D-F~~ | ~~ONE TO PLURAL~~ |
| ~~9~~ | ~~D-F~~ | ~~E:D-F,G~~ | ~~ONE TO PLURAL~~ |
| 10 | E:D-F,G | D-F | PLURAL TO ONE |
| 11 | E:D-F,G | G | PLURAL TO ONE |
| ~~12~~ | ~~G~~ | ~~E:D-F,G~~ | ~~ONE TO PLURAL~~ |

FIG. 13

INTER-TABLE GROUP RELATION TABLE  320

| ID | ORIGINAL TABLE GROUP | TARGET TABLE GROUP | RELATION |
|---|---|---|---|
| 3 | A-B | C:D-F | PLURAL TO ONE |
| 4 | C:D-F | A-B | ONE TO PLURAL |

ALLOCATION TABLE 321

| ID | TABLE GROUP | ALLOCATION NUMBER |
|---|---|---|
| 1 | A | 8 |
| 2 | B | 8 |
| 3 | C | 10 |
| 4 | D | 9 |
| 5 | E | 11 |
| 6 | F | 9 |
| 7 | G | 11 |
| 8 | A-B | |
| 9 | D-F | 10,11 |
| 10 | C:D-F | |
| 11 | E:D-F,G | |

FIG. 15
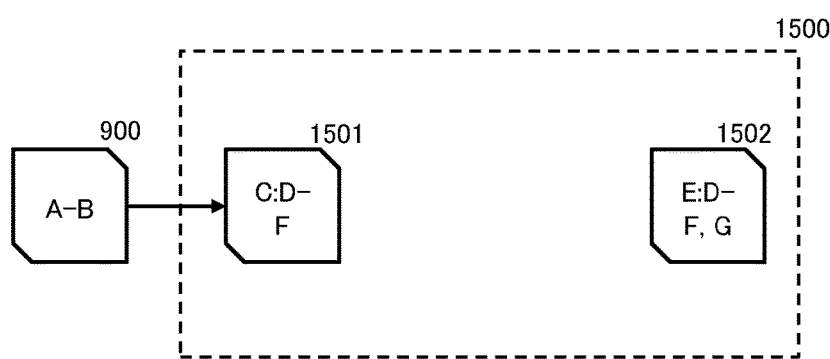
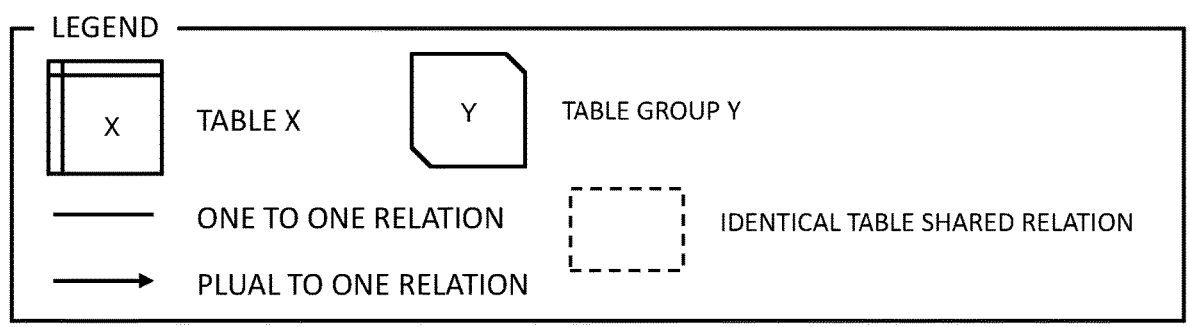

FIG. 16
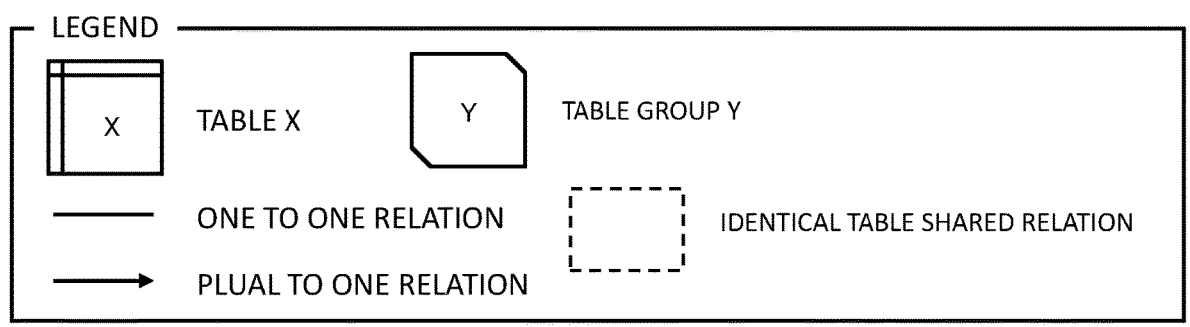

FIG. 17

ALLOCATION TABLE 321

| ID | TABLE GROUP | ALLOCATION NUMBER |
|---|---|---|
| 1 | A | 8 |
| 2 | B | 8 |
| 3 | C | 10 |
| 4 | D | 9 |
| 5 | E | 11 |
| 6 | F | 9 |
| 7 | G | 11 |
| 8 | A-B | 12 |
| 9 | D-F | 10,11 |
| 10 | C:D-F | 12 |
| 11 | E:D-F,G | |
| 12 | A-B:C,D-F,G | |

FIG. 18A
FIG. 18B
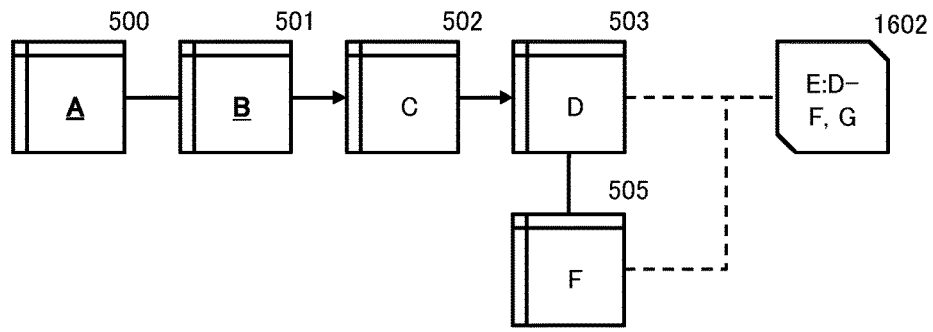
FIG. 18C
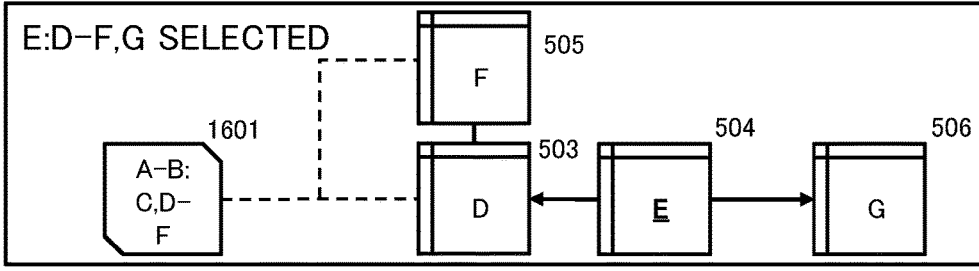
LEGEND
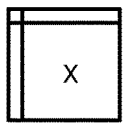 TABLE X       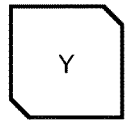 TABLE GROUP Y
 ONE TO ONE RELATION
 PLUAL TO ONE RELATION
 IDENTICAL TABLE SHARED RELATION
 SHARING T RELATION BETWEEN TABLES

FIG. 24
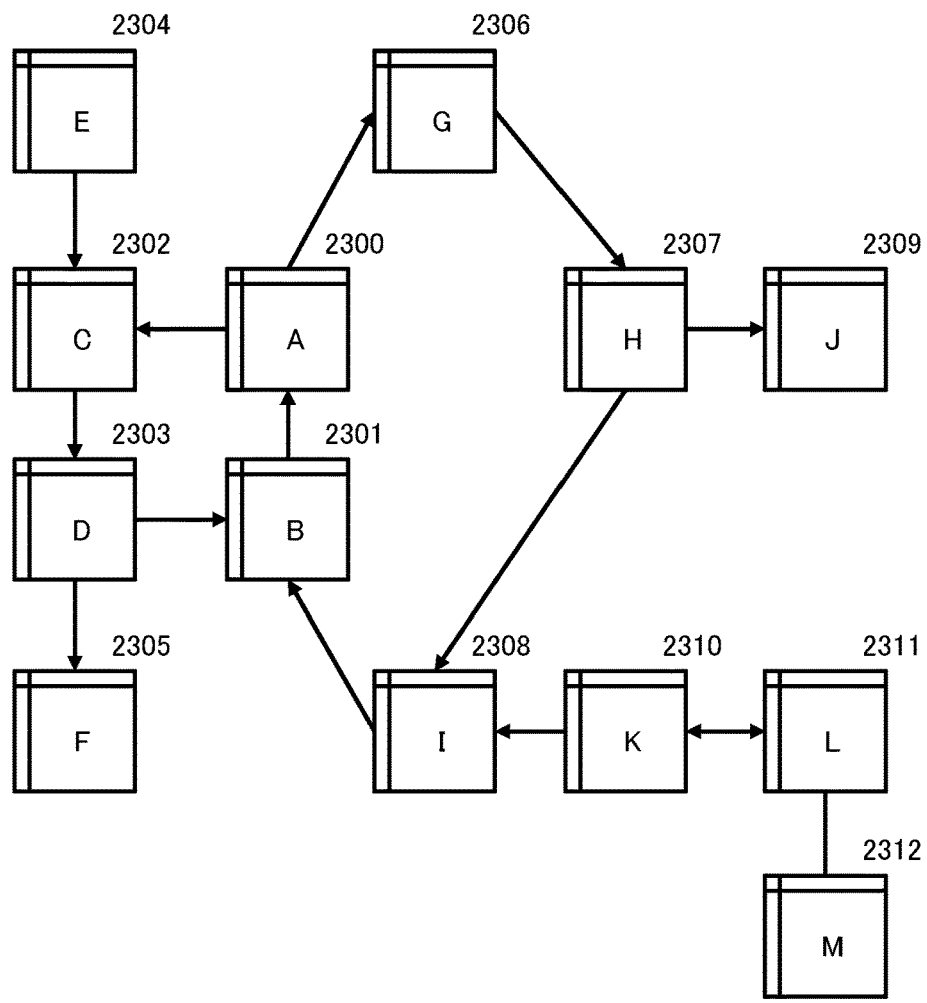
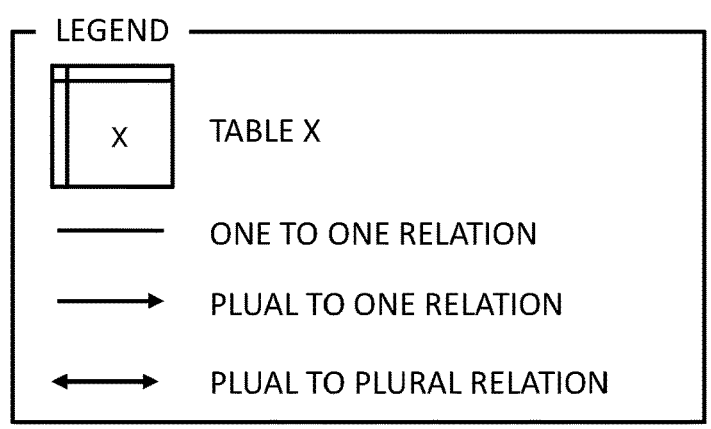

FIG. 25

INTER-TABLE GROUP RELATION INFORMATIOM  200

| ID | ORIGINAL TABLE | TARGET TABLE | RELATION |
|---|---|---|---|
| 1 | A | C | PLURAL TO ONE |
| 2 | A | G | PLURAL TO ONE |
| 3 | A | B | ONE TO PLURAL |
| 4 | B | A | PLURAL TO ONE |
| 5 | B | D | ONE TO PLURAL |
| 6 | B | I | ONE TO PLURAL |
| 7 | C | A | ONE TO PLURAL |
| 8 | C | D | PLURAL TO ONE |
| 9 | C | E | ONE TO PLURAL |
| 10 | D | B | PLURAL TO ONE |
| 11 | D | C | ONE TO PLURAL |
| 12 | D | F | PLURAL TO ONE |
| 13 | E | C | PLURAL TO ONE |
| 14 | F | D | ONE TO PLURAL |
| 15 | G | A | ONE TO PLURAL |
| 16 | G | H | PLURAL TO ONE |
| 17 | H | G | ONE TO PLURAL |
| 18 | H | J | PLURAL TO ONE |
| 19 | H | I | PLURAL TO ONE |
| 20 | I | H | ONE TO PLURAL |
| 21 | I | K | ONE TO PLURAL |
| 22 | I | B | PLURAL TO ONE |
| 23 | J | H | ONE TO PLURAL |
| 24 | K | I | PLURAL TO ONE |
| 25 | K | L | PLURAL TO PLURAL |
| 26 | L | K | PLURAL TO PLURAL |
| 27 | L | M | ONE TO ONE |
| 28 | M | L | ONE TO ONE |

FIG. 26

INTER-TABLE GROUP RELATION INFORMATIOM  200

| ID | ORIGINAL TABLE | TARGET TABLE | RELATION |
|---|---|---|---|
| 1 | A | C | PLURAL TO ONE |
| 2 | A | G | PLURAL TO ONE |
| 3 | A | B | ONE TO PLURAL |
| 4 | B | A | PLURAL TO ONE |
| 5 | B | D | ONE TO PLURAL |
| 6 | B | I | ONE TO PLURAL |
| 7 | C | A | ONE TO PLURAL |
| 8 | C | D | PLURAL TO ONE |
| 9 | C | E | ONE TO PLURAL |
| 10 | D | B | PLURAL TO ONE |
| 11 | D | C | ONE TO PLURAL |
| 12 | D | F | PLURAL TO ONE |
| 13 | E | C | PLURAL TO ONE |
| 14 | F | D | ONE TO PLURAL |
| 15 | G | A | ONE TO PLURAL |
| 16 | G | H | PLURAL TO ONE |
| 17 | H | G | ONE TO PLURAL |
| 18 | H | J | PLURAL TO ONE |
| 19 | H | I | PLURAL TO ONE |
| 20 | I | H | ONE TO PLURAL |
| 21 | I | K | ONE TO PLURAL |
| 22 | I | B | PLURAL TO ONE |
| 23 | J | H | ONE TO PLURAL |
| 24 | K | I | PLURAL TO ONE |
| 27 | L | M | ONE TO ONE |
| 28 | M | L | ONE TO ONE |

FIG. 27

PLURAL TO PLURAL RELATION TABLE LIST   1904

| ID | ORIGINAL TABLE | TARGET TABLE |
|---|---|---|
| 1 | K | L |
| 2 | L | K |

FIG. 29
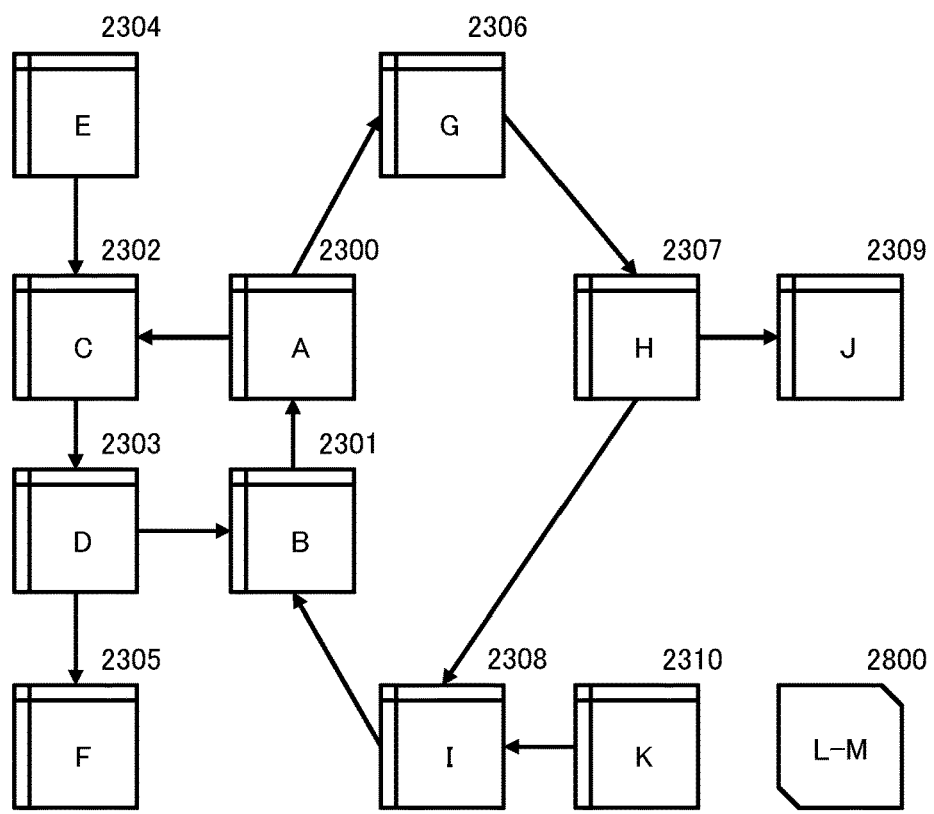
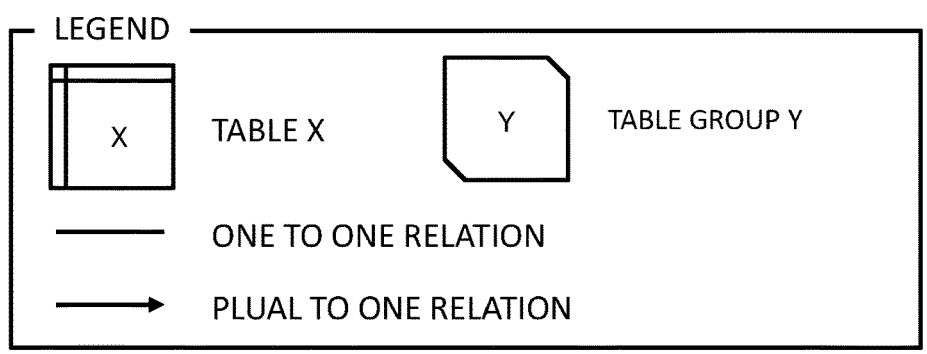

FIG. 30

INTER-TABLE GROUP RELATION TABLE  320

| ID | ORIGINAL TABLE GROUP | TARGET TABLE GROUP | RELATION |
|---|---|---|---|
| 1 | A | C | PLURAL TO ONE |
| 2 | A | G | PLURAL TO ONE |
| 3 | A | B | ONE TO PLURAL |
| 4 | B | A | PLURAL TO ONE |
| 5 | B | D | ONE TO PLURAL |
| 6 | B | I | ONE TO PLURAL |
| 7 | C | A | ONE TO PLURAL |
| 8 | C | D | PLURAL TO ONE |
| 9 | C | E | ONE TO PLURAL |
| 10 | D | B | PLURAL TO ONE |
| 11 | D | C | ONE TO PLURAL |
| 12 | D | F | PLURAL TO ONE |
| 13 | E | C | PLURAL TO ONE |
| 14 | F | D | ONE TO PLURAL |
| 15 | G | A | ONE TO PLURAL |
| 16 | G | H | PLURAL TO ONE |
| 17 | H | G | ONE TO PLURAL |
| 18 | H | J | PLURAL TO ONE |
| 19 | H | I | PLURAL TO ONE |
| 20 | I | H | ONE TO PLURAL |
| 21 | I | K | ONE TO PLURAL |
| 22 | I | B | PLURAL TO ONE |
| 23 | J | H | ONE TO PLURAL |
| 24 | K | I | PLURAL TO ONE |

FIG. 31

ALLOCATION TABLE    2212

| ID (700) | TABLE GROUP (701) | ALLOCATION NUMBER (702) | CLOSED SHARE NUMBER (3000) |
|---|---|---|---|
| 1 | A | | |
| 2 | B | | |
| 3 | C | | |
| 4 | D | | |
| 5 | E | | |
| 6 | F | | |
| 7 | G | | |
| 8 | H | | |
| 9 | I | | |
| 10 | J | | |
| 11 | K | | |
| 12 | L | 14 | |
| 13 | M | 14 | |
| 14 | L-M | | |

FIG. 32

ALLOCATION TABLE  2212

| ID (700) | TABLE GROUP (701) | ALLOCATION NUMBER (702) | CLOSED SHARE NUMBER (3000) |
|---|---|---|---|
| 1 | A | 15,16 | |
| 2 | B | 15,16 | |
| 3 | C | 15 | |
| 4 | D | 15 | |
| 5 | E | | |
| 6 | F | | |
| 7 | G | 16 | |
| 8 | H | 16 | |
| 9 | I | 16 | |
| 10 | J | | |
| 11 | K | | |
| 12 | L | 14 | |
| 13 | M | 14 | |
| 14 | L-M | | |
| 15 | A*C*D*B | | 16 |
| 16 | A*G*H*I*B | | 15 |

FIG. 33

INTER-TABLE GROUP RELATION TABLE    320

| ID | ORIGINAL TABLE GROUP | TARGET TABLE GROUP | RELATION |
|---|---|---|---|
| ~~1~~ | ~~A*C*D*B,A*G*H*I*B~~ | ~~A*C*D*B~~ | ~~PLURAL TO ONE~~ |
| ~~2~~ | ~~A*C*D*B,A*G*H*I*B~~ | ~~A*G*H*I*B~~ | ~~PLURAL TO ONE~~ |
| ~~3~~ | ~~A*C*D*B,A*G*H*I*B~~ | ~~A*C*D*B,A*G*H*I*B~~ | ~~ONE TO PLURAL~~ |
| ~~4~~ | ~~A*C*D*B,A*G*H*I*B~~ | ~~A*C*D*B,A*G*H*I*B~~ | ~~PLURAL TO ONE~~ |
| ~~5~~ | ~~A*C*D*B,A*G*H*I*B~~ | ~~A*C*D*B,~~ | ~~ONE TO PLURAL~~ |
| ~~6~~ | ~~A*C*D*B,A*G*H*I*B~~ | ~~A*G*H*I*B~~ | ~~ONE TO PLURAL~~ |
| ~~7~~ | ~~A*C*D*B~~ | ~~A*C*D*B,A*G*H*I*B~~ | ~~ONE TO PLURAL~~ |
| ~~8~~ | ~~A*C*D*B~~ | ~~A*C*D*B~~ | ~~PLURAL TO ONE~~ |
| 9 | A*C*D*B | E | ONE TO PLURAL |
| ~~10~~ | ~~A*C*D*B~~ | ~~A*C*D*B,A*G*H*I*B~~ | ~~PLURAL TO ONE~~ |
| ~~11~~ | ~~A*C*D*B~~ | ~~A*C*D*B~~ | ~~ONE TO PLURAL~~ |
| 12 | A*C*D*B | F | PLURAL TO ONE |
| 13 | E | A*C*D*B | PLURAL TO ONE |
| 14 | F | A*C*D*B | ONE TO PLURAL |
| ~~15~~ | ~~A*G*H*I*B~~ | ~~A*C*D*B,A*G*H*I*B~~ | ~~ONE TO PLURAL~~ |
| ~~16~~ | ~~A*G*H*I*B~~ | ~~A*G*H*I*B~~ | ~~PLURAL TO ONE~~ |
| ~~17~~ | ~~A*G*H*I*B~~ | ~~A*G*H*I*B~~ | ~~ONE TO PLURAL~~ |
| 18 | A*G*H*I*B | J | PLURAL TO ONE |
| ~~19~~ | ~~A*G*H*I*B~~ | ~~A*G*H*I*B~~ | ~~PLURAL TO ONE~~ |
| ~~20~~ | ~~A*G*H*I*B~~ | ~~A*G*H*I*B~~ | ~~ONE TO PLURAL~~ |
| 21 | A*G*H*I*B | K | ONE TO PLURAL |
| ~~22~~ | ~~A*G*H*I*B~~ | ~~A*C*D*B,A*G*H*I*B~~ | ~~PLURAL TO ONE~~ |
| 23 | J | A*G*H*I*B | ONE TO PLURAL |
| 24 | K | A*G*H*I*B | PLURAL TO ONE |

FIG. 34

INTER-TABLE GROUP RELATION TABLE     320

| ID | ORIGINAL TABLE GROUP | TARGET TABLE GROUP | RELATION |
|---|---|---|---|
| 9 | A*C*D*B | E | ONE TO PLURAL |
| 12 | A*C*D*B | F | PLURAL TO ONE |
| 13 | E | A*C*D*B | PLURAL TO ONE |
| 14 | F | **A*C*D*B | ONE TO PLURAL** |
| 18 | A*G*H*I*B | J | PLURAL TO ONE |
| 21 | A*G*H*I*B | K | ONE TO PLURAL |
| 23 | J | **A*G*H*I*B | ONE TO PLURAL** |
| 24 | K | A*G*H*I*B | PLURAL TO ONE |

FIG. 35
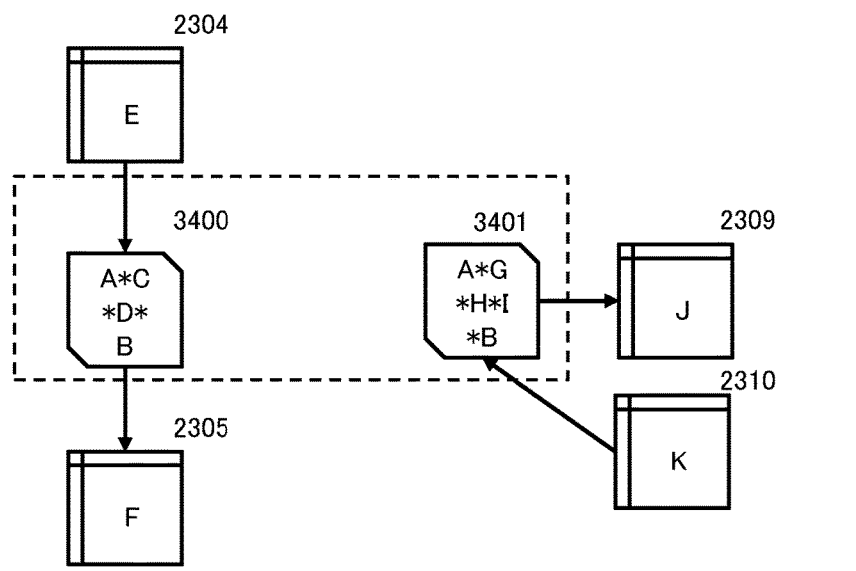
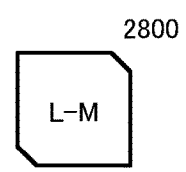
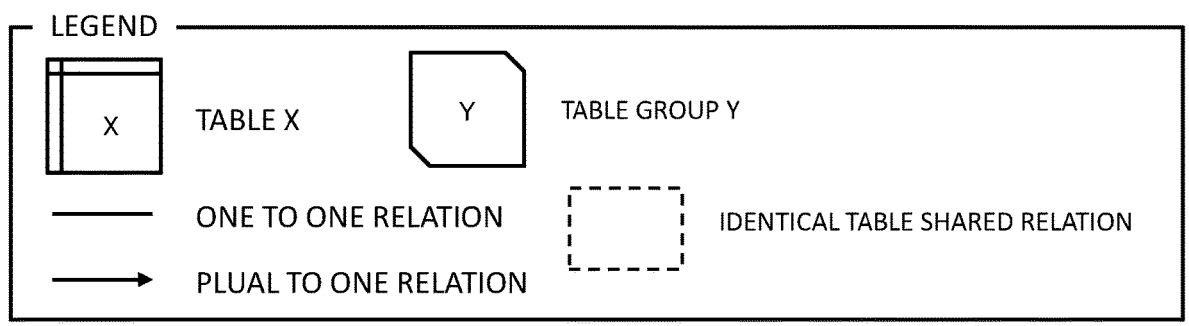

FIG. 36

ALLOCATION TABLE    2212

| ID | TABLE GROUP | ALLOCATION NUMBER | CLOSED SHARE NUMBER |
|---|---|---|---|
| 1 | A | 15,16 | |
| 2 | B | 15,16 | |
| 3 | C | 15 | |
| 4 | D | 15 | |
| 5 | E | | |
| 6 | F | 17 | |
| 7 | G | 16 | |
| 8 | H | 16 | |
| 9 | I | 16 | |
| 10 | J | 18 | |
| 11 | K | | |
| 12 | L | 14 | |
| 13 | M | 14 | |
| 14 | L-M | | |
| 15 | A*C*D*B | 17 | 16 |
| 16 | A*G*H*I*B | 18 | 15 |
| 17 | A*C*D*B:F | | |
| 18 | A*G*H*I*B:J | | |

FIG. 37
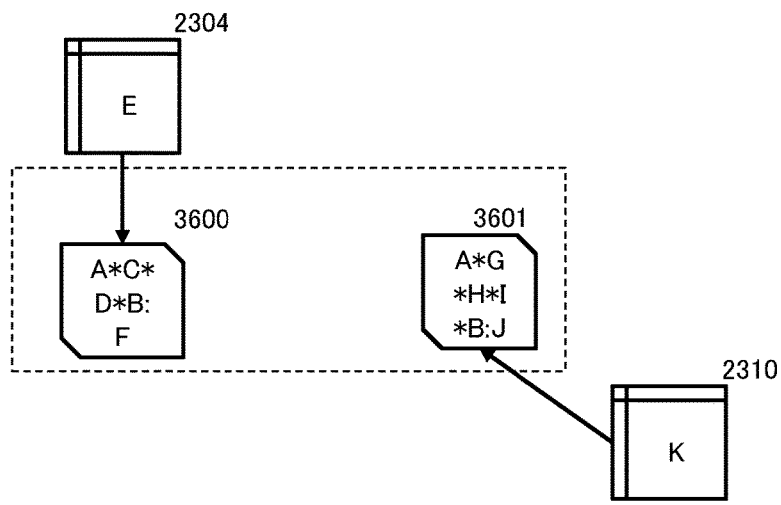
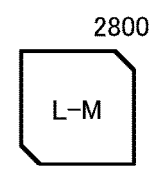
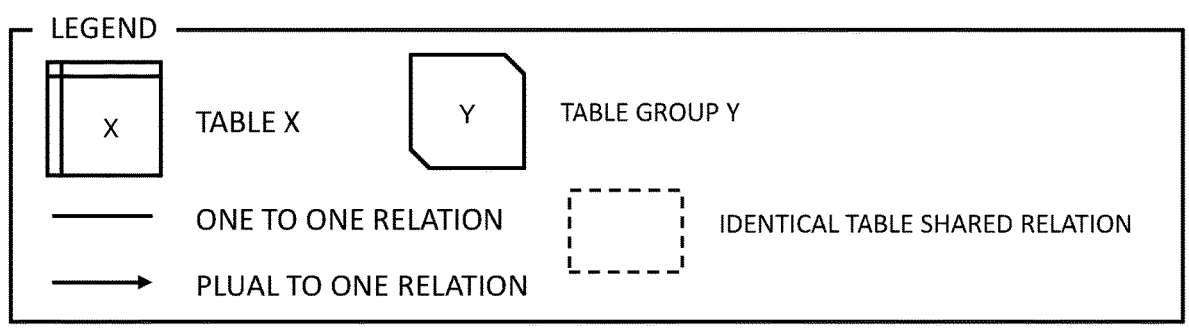

FIG. 38

ALLOCATION TABLE  2212

| ID (700) | TABLE GROUP (701) | ALLOCATION NUMBER (702) | CLOSED SHARE NUMBER (3000) |
|---|---|---|---|
| 1 | A | 15,16 | |
| 2 | B | 15,16 | |
| 3 | C | 15 | |
| 4 | D | 15 | |
| 5 | E | 19 | |
| 6 | F | 17 | |
| 7 | G | 16 | |
| 8 | H | 16 | |
| 9 | I | 16 | |
| 10 | J | 18 | |
| 11 | K | 20 | |
| 12 | L | 14 | |
| 13 | M | 14 | |
| 14 | L-M | | |
| 15 | A*C*D*B | 17 | 16 |
| 16 | A*G*H*I*B | 18 | 15 |
| 17 | A*C*D*B:F | 19 | |
| 18 | A*G*H*I*B:J | 20 | |
| 19 | E:A*C*D*B,F | | |
| 20 | K:A*G*H*I*B,J | | |

FIG. 39
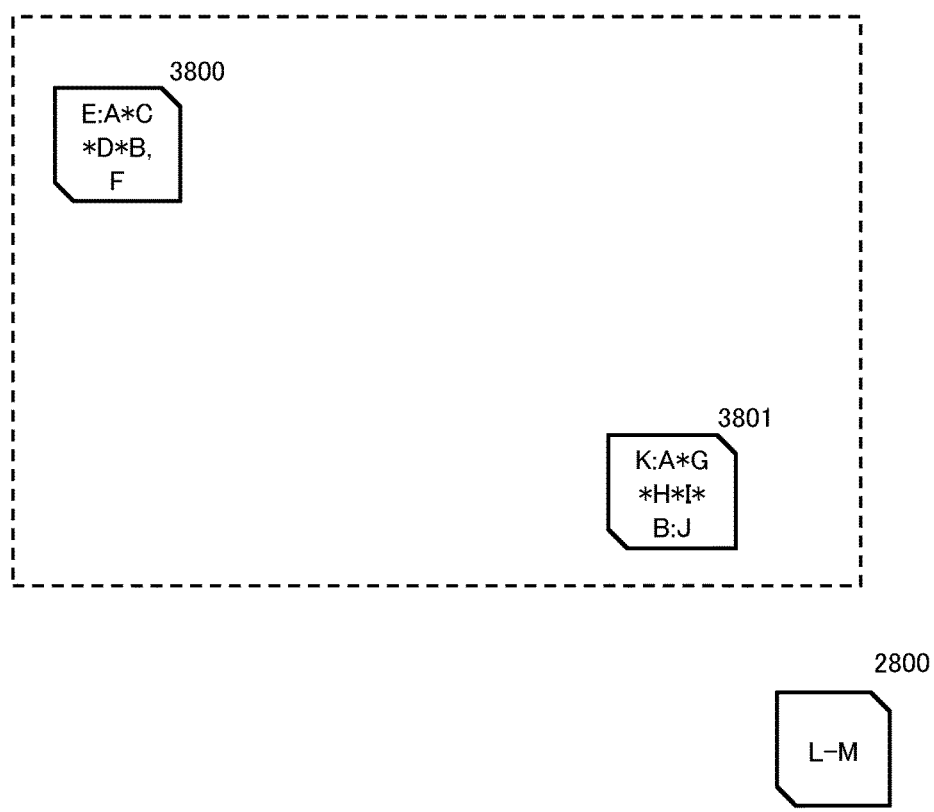
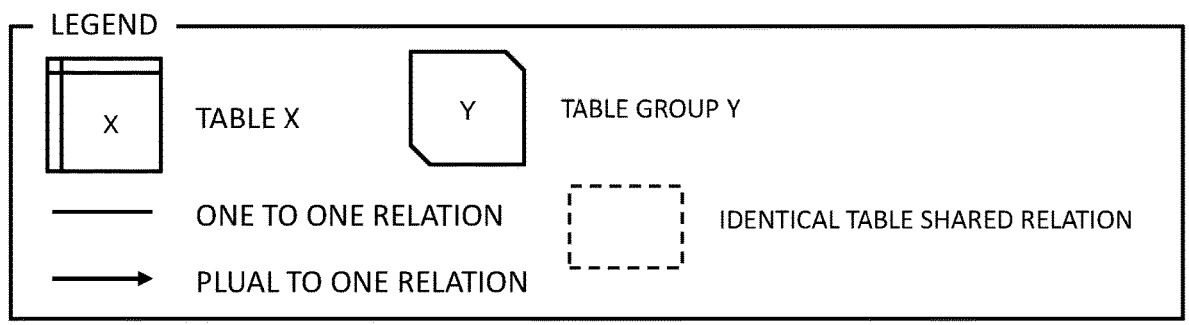

FIG. 40
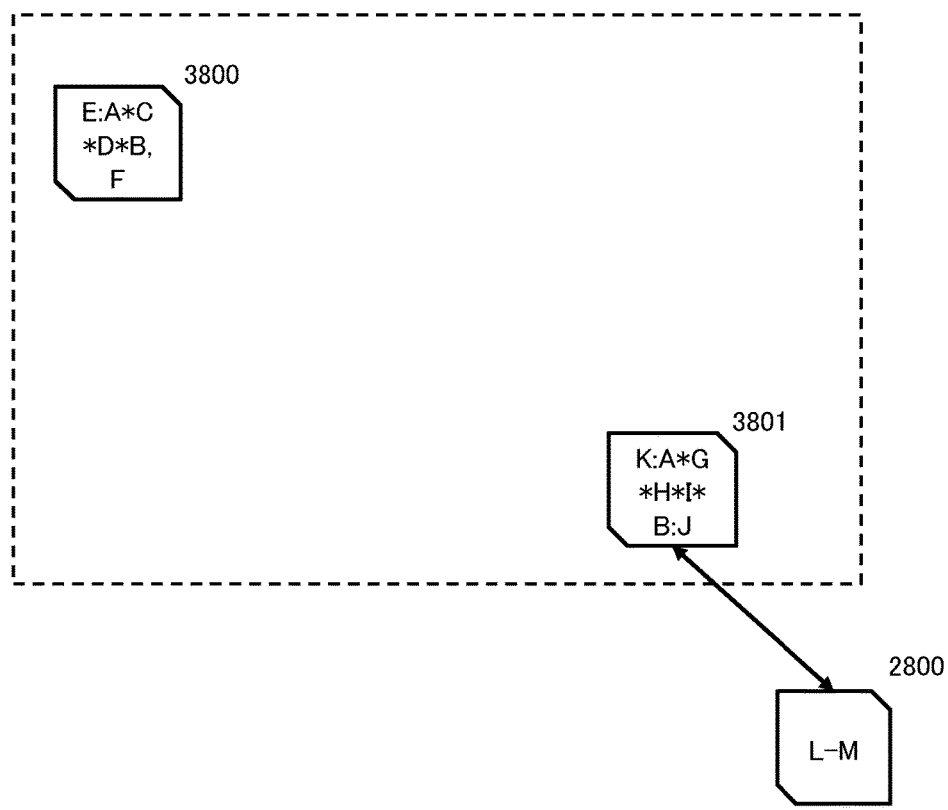
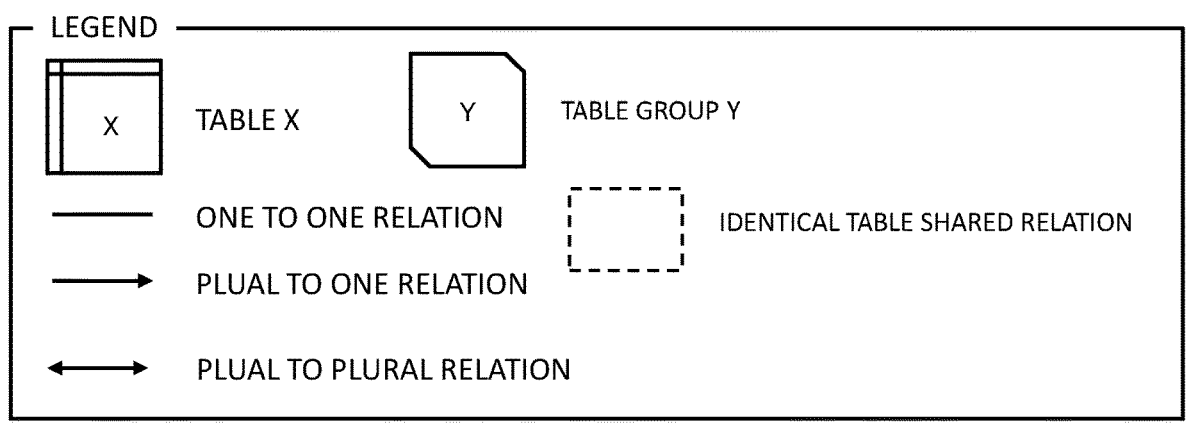

FIG. 43

EMPLOYEE PROFILE TABLE    21

↓ EXTERNAL KEY

| EMPLOYEE ID | NAME | SEX | ADDRESS | PHONE NUMBER |
|---|---|---|---|---|
| e001 | YAMA○○o | MALE | TOKYO... | 03XXXX |
| e002 | TA△△KO | FEMALE | KANAGAWA... | 045YYYY |
| e003 | NAKA□□KA | FEMALE | HIROSHIMA... | 0823ZZZ |
| ⋮ | ⋮ | ⋮ | ⋮ | ⋮ |

FIG. 44

EMPLOYEE SALARY TABLE  22

↓ EXTERNAL KEY

| EMPLOYEE ID | MONTH | SALARY |
|---|---|---|
| e001 | JANUARY, 2017 | 253,500 |
| e001 | FEBRUARY, 2017 | 242,300 |
| e001 | MARCH, 2017 | 221,700 |
| ⋮ | ⋮ | ⋮ |
| e002 | JANUARY, 2017 | 193,200 |
| e002 | FEBRUARY, 2017 | 194,500 |
| e002 | MARCH, 2017 | 196,700 |

⋮     ⋮     ⋮

TABLE RELATION ANALYSIS ASSISTING APPARATUS AND TABLE RELATION ANALYSIS ASSISTING METHOD

BACKGROUND

The present invention relates to table relation analysis assisting apparatuses and table relation analysis assisting methods and in particular to a table relation analysis assisting apparatus and a table relation analysis assisting method suitable for analyzing a relation between tables in a relational database.

To perform system maintenance or replace development, it is important to grasp relations between pieces of data used in a target system. Database systems have been conventionally utilized to search for or analyze data with a computer. Especially, the relational database designed and developed based on relation models is in the mainstream of databases. In relational databases, varied data is included in tables and grasping a relation between tables leads to understanding of a relation between pieces of data. In a system in which there are a large number of tables, in general, a relation between tables is complicated and it is difficult to understand the relation. To cope with this, a plurality of tables can be assembled into a set for presentation. Thus, relations to be understood in one time can be reduced and this facilitates understanding of a relation between tables and as a result, a relation between pieces of data can be more easily understood. For example, Japanese Unexamined Patent Application Publication No. 2010-39593 discloses a table classification method in which tables are classified by hierarchically organizing the tables so as to facilitate integration of databases.

The technology described in Japanese Unexamined Patent Application Publication No. 2010-39593 pertaining to the related art is intended to consolidate similar tables present in each system when integrating a plurality of systems utilizing relational databases. According to the technology described in Japanese Unexamined Patent Application Publication No. 2010-39593, attention is paid to the order and position of occurrence of each column in a table and the number of occurrences of similar columns. However, since there is no limitation on the position or order of each column in relational databases in general, this technology cannot be effectively utilized in some cases. In cases where the technology is applied to a single system, a large number of similar columns do not frequently occur due to the execution of normalization or the like and it is difficult to organize tables by focusing attention on the number of occurrences of columns.

SUMMARY OF THE INVENTION

It is an object of the present invention to provide a table relation analysis assisting apparatus in which it is easier to intuitively grasp a relation between tables in a relational database by focusing attention on data occurrence relation.

A configuration of a table relation analysis assisting apparatus according to the present invention is preferably a table relation analysis assisting apparatus that analyzes a relation of data in a specific column between tables in a relational database. The table relation analysis assisting apparatus includes: inter-table relation analysis information in which tables the data of which is a one to one relation or a plural to one relation are defined as one table group; a one to one relation folding unit that outputs the inter-table relation analysis information obtained by consolidating tables in a one to one relation from inter-table relation information into a table group; a plural to one relation folding unit that consolidates tables in a plural to one relation into a table group and thereby updating the inter-table relation analysis information; and an analysis result display unit that displays details of the inter-table relation analysis information. The analysis result display unit provides a display in such a form that one or more tables in a relational database are contracted into a table group.

According to the present invention, it is possible to provide a table relation analysis assisting apparatus that makes it possible to intuitively grasp a relation between tables in a relational database by focusing attention on table occurrence relation.

BRIEF DESCRIPTION OF THE DRAWINGS

FIG. 5 is a diagram illustrating a relation between tables in a relational database in the first embodiment (#1);

FIG. 6 is a drawing illustrating an example of an inter-table group relation table in the first embodiment (#1);

FIG. 7 is a drawing illustrating an example of an allocation table (#1);

FIG. 8 is a drawing illustrating an example of an inter-table group relation table in the first embodiment (#2);

FIG. 9 is a diagram illustrating a relation between tables in a relational database in the first embodiment (#2);

FIG. 10 is a drawing illustrating an example of an inter-table group relation table in the first embodiment (#3);

FIG. 11 is a drawing illustrating an example of an allocation table in the first embodiment (#2);

FIG. 12 is a drawing illustrating an example of an inter-table group relation table in the first embodiment (#4);

FIG. 13 is a drawing illustrating an example of an inter-table group relation table in the first embodiment (#5);

FIG. 14 is a drawing illustrating an example of an allocation table in the first embodiment (#3);

FIG. 15 is a diagram illustrating a relation between tables in a relational database in the first embodiment (#3);

FIG. 16 is a diagram illustrating a relation between tables in a relational database in the first embodiment (#4);

FIG. 17 is a drawing illustrating an example of an allocation table in the first embodiment (#4);

FIGS. 18A to 18C is a drawing illustrating an example of a display screen for a result of analysis by a table relation analysis assisting apparatus in the first embodiment;

FIG. 24 is a diagram illustrating a relation between tables in a relational database in the second embodiment (#1);

FIG. 25 is a drawing illustrating an example of inter-table relation information in the second embodiment;

FIG. 26 is a drawing illustrating an example of inter-table relation information with a broken plural to plural relation;

FIG. 27 is a drawing illustrating an example of a plural to plural relation table list;

FIG. 29 is a diagram illustrating a relation between tables in a relational database in the second embodiment (#3);

FIG. 30 is a drawing illustrating an example of an inter-table group relation table in the second embodiment (#1);

FIG. 31 is a drawing illustrating an example of an allocation table in the second embodiment (#1);

FIG. 32 is a drawing illustrating an example of an allocation table in the second embodiment (#2);

FIG. 33 is a drawing illustrating an example of an inter-table group relation table in the second embodiment (#2);

FIG. 34 is a drawing illustrating an example of an inter-table group relation table in the second embodiment (#3);

FIG. 35 is a diagram illustrating a relation between tables in a relational database in the second embodiment (#4);

FIG. 36 is a drawing illustrating an example of an allocation table in the second embodiment (#3);

FIG. 37 is a diagram illustrating a relation between tables in a relational database in the second embodiment (#5);

FIG. 38 is a drawing illustrating an example of an allocation table in the second embodiment (#4);

FIG. 39 is a diagram illustrating a relation between tables in a relational database in the second embodiment (#6);

FIG. 40 is a drawing illustrating an example of a display screen for a result of analysis by a table relation analysis assisting apparatus in the second embodiment (#1);

FIG. 43 is a drawing illustrating an employee profile table; and

FIG. 44 is a drawing illustrating an employee salary table.

DETAILED DESCRIPTION OF THE PREFERRED EMBODIMENTS

Hereafter, a description will be given to embodiments of the present invention with reference to FIG. 1 to FIG. 44.

Relation Between Tables

First, a description will be given to correspondence between tables on which attention is focused in analyzing a table relation in the embodiments with reference to FIG. 42 to FIG. 44.

Figure 42:
FIG. 42 is a drawing illustrating an employee ID table.

FIG. 42 to FIG. 44 are tables taken as an example for this purpose.

What on which relational databases are based is a table comprised of columns (vertical fields) given names and records (horizontally arranged) filling values thereof. A plurality of tables are logically linked with one another by an external key (FK) ensuring reference matching property.

The employee ID table 20 shown in FIG. 42 is a table for storing employee IDs. The employee profile table 21 shown in FIG. 43 is a table for storing employee profiles such as name and address. The employee profile table 21 shown in FIG. 43 is a table for storing a respective profile such as name and address of each employee. The employee salary table 22 shown in FIG. 44 is a table for storing each employee's monthly salary. The three tables are logically linked with one another by employee ID as an external key. For example, it can be seen that the name of an employee whose employee ID is "e001" is "YAMAOOo" and his salary for "January, 2017" is "253,500 yen."

When attention is focused on the occurrence of data in the column of employee ID as an external key, there is a one to one relation between the employee ID table 20 and the employee profile table 21. With respect to this, the following embodiments will define that these tables are in a "one to one relation."

Here, the employee ID table 20 will be considered as an original table and the employee salary table 22 will be considered as a target table. With respect to the occurrence of data of employee ID, the employee ID table 20 and the employee salary table 22 are in a one to plural relation. In this case, the following embodiments will define that the employee ID table 20 as an original table and the employee salary table 22 as a target table are in a "one to plural relation."

Conversely, when the employee salary table 22 is considered as an original table and the employee ID table 20 is considered as a target table, these tables are in a plural to one relation. In this case, it will be defined that the employee salary table 22 as an original table and the employee ID table 20 as a target table are in a "plural to one relation."

Though not specially stated, when pieces of data in columns as an external key in two tables are in a plural to plural relation, it will be defined that the two tables are in a "plural to plural relation."

First Embodiment

A description will be given to a first embodiment of the present invention with reference to FIG. 1 to FIG. 18C.

First, a description will be given to a configuration of a table relation analysis assisting apparatus in the first embodiment with reference to FIG. 1 and FIG. 2.

The table relation analysis assisting apparatus 100 is comprised of various functional units: a one to one relation folding unit 201, a plural to one relation folding unit 203, and an analysis result display unit 204.

The one to one relation folding unit 201 uses inter-table relation information 200 as an input and outputs inter-table relation analysis information 202. The inter-table relation information 200 is information about correspondence between tables in a relational database. The inter-table relation analysis information 202 is information obtained by consolidating corresponding tables into a table group based on inter-table relation information. Concrete examples of the inter-table relation information 200 and the inter-table relation analysis information 202 will be described later.

The plural to one relation folding unit 203 uses inter-table relation analysis information 202 as an input and consolidates tables in a plural to one relation into a table group, thereby updating the inter-table relation analysis information 202.

The analysis result display unit 204 displays the inter-table relation information 200 and the inter-table relation analysis information 202 on a display device 120 such as a display in a user viewable form.

Figure 1:
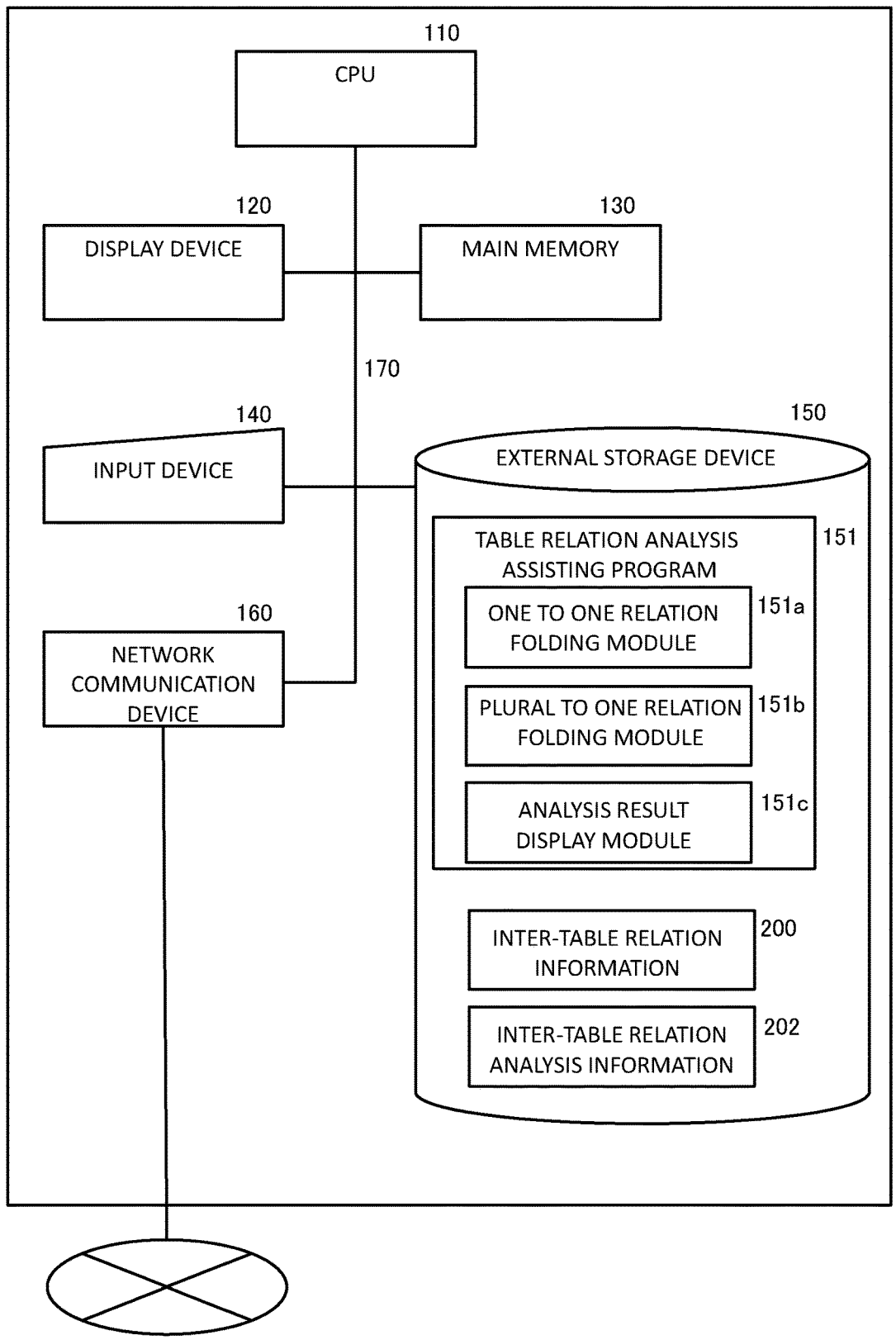
FIG. 1 is a drawing illustrating a functional configuration of a table relation analysis assisting apparatus in a first embodiment.
Figure 2:
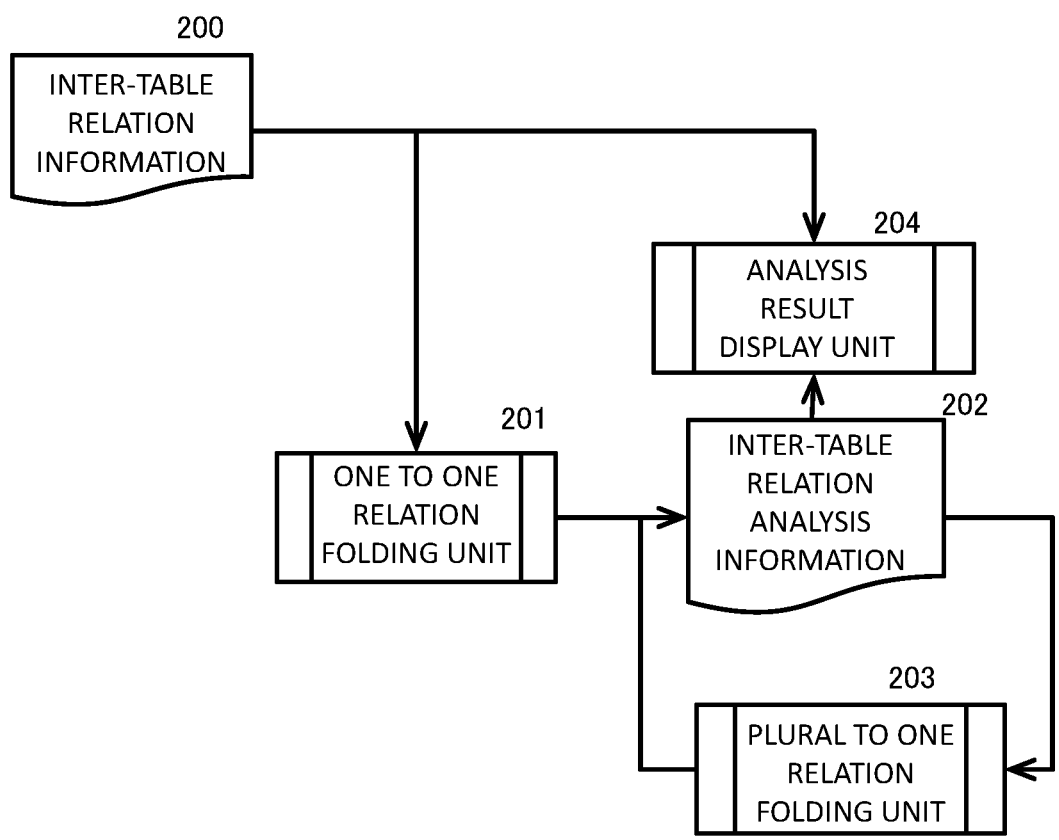
FIG. 2 is a drawing illustrating a hardware and software configuration of a table relation analysis assisting apparatus in the first embodiment.

The table relation analysis assisting apparatus 100 is constructed of a common information processing device and includes CPU (Central Processing Unit) 110, the display device 120, a main memory 130, an input device 140, an external storage device 150, and a network communication device 160 as illustrated in FIG. 1.

The CPU 110, the display device 120, the main memory 130, the input device 140, the external storage device 150, and the network communication device 160 are connected with one another via a bus 170 and capable of transmitting and receiving data.

The CPU 110 executes programs and data loaded from the external storage device 150 into the main memory 130 and controls each part of the table relation analysis assisting apparatus 100.

The external storage device 150 is a large-capacity storage device such as HDD (Hard Disk Drive) and SDD (Solid State Drive). In the external storage device 150, a table relation analysis assisting program 151 is installed and the inter-table relation information 200 and the inter-table relation analysis information 202 are stored.

The table relation analysis assisting program 151 is comprised of a one to one relation folding module 151*a*, a plural to one relation folding module 151*b*, and an analysis result display module 151*c* as subprograms.

Each of the one to one relation folding module 151*a*, the plural to one relation folding module 151*b*, and the analysis result display module 151*c* is a module executing the functions of a respective functional unit of the one to one relation folding unit 201, the plural to one relation folding unit 203, and the analysis result display unit 204. The CPU 110 executes these modules loaded from the external storage device 150 into the main memory 130.

In the first embodiment, as illustrated in FIG. 1, the table relation analysis assisting apparatus 100 invokes the one to one relation folding unit 201, the plural to one relation folding unit 203, and the analysis result display unit 204 in this order and executes processing.

The one to one relation folding unit 201 uses the inter-table relation information 200 as an input and outputs the inter-table relation analysis information 202. The inter-table relation information 200 includes at least information about cardinality between tables in a relational database. As initially described as an example, the cardinality information refers to information indicating association between pieces of data in columns on which attention is focused in respective tables. The cardinality information includes at least an original table as a starting point, a target table as a destination, and a relation expressed by any one of one to one relation, one to plural relation, plural to one relation, and plural to plural relation. The inter-table relation analysis information 202 is comprised of an inter-table group relation table 320 and an allocation table 321. The inter-table group relation table 320 is a table indicating a relation between tables and includes at least an original table group 601 as a starting point, a target table group 602 as a destination, and a relation 603 between these table groups with respect to table groups. (A concrete example will be described later.) The table group is obtained by consolidating one or more tables or table groups into one and one of them is taken as a representative table group.

In this embodiment, various naming rules are adopted to identify table groups but these naming rules need not be used as long as each table group is identifiable. The allocation table 321 is a calculation table for consolidating tables into a table group and includes at least ID 700 identifying each information, table group 701, and allocation number 702. (A concrete example will be described later.)

The plural to one relation folding unit 203 updates the inter-table relation analysis information 202 with plural to one relation tables consolidated into a table group.

The analysis result display unit 204 edits inter-table relation information 200 or analyzed inter-table relation analysis information 202 and graphically outputs a result of edition to the display device 120. (A concrete example of a display will be described later.)

Figure 3:
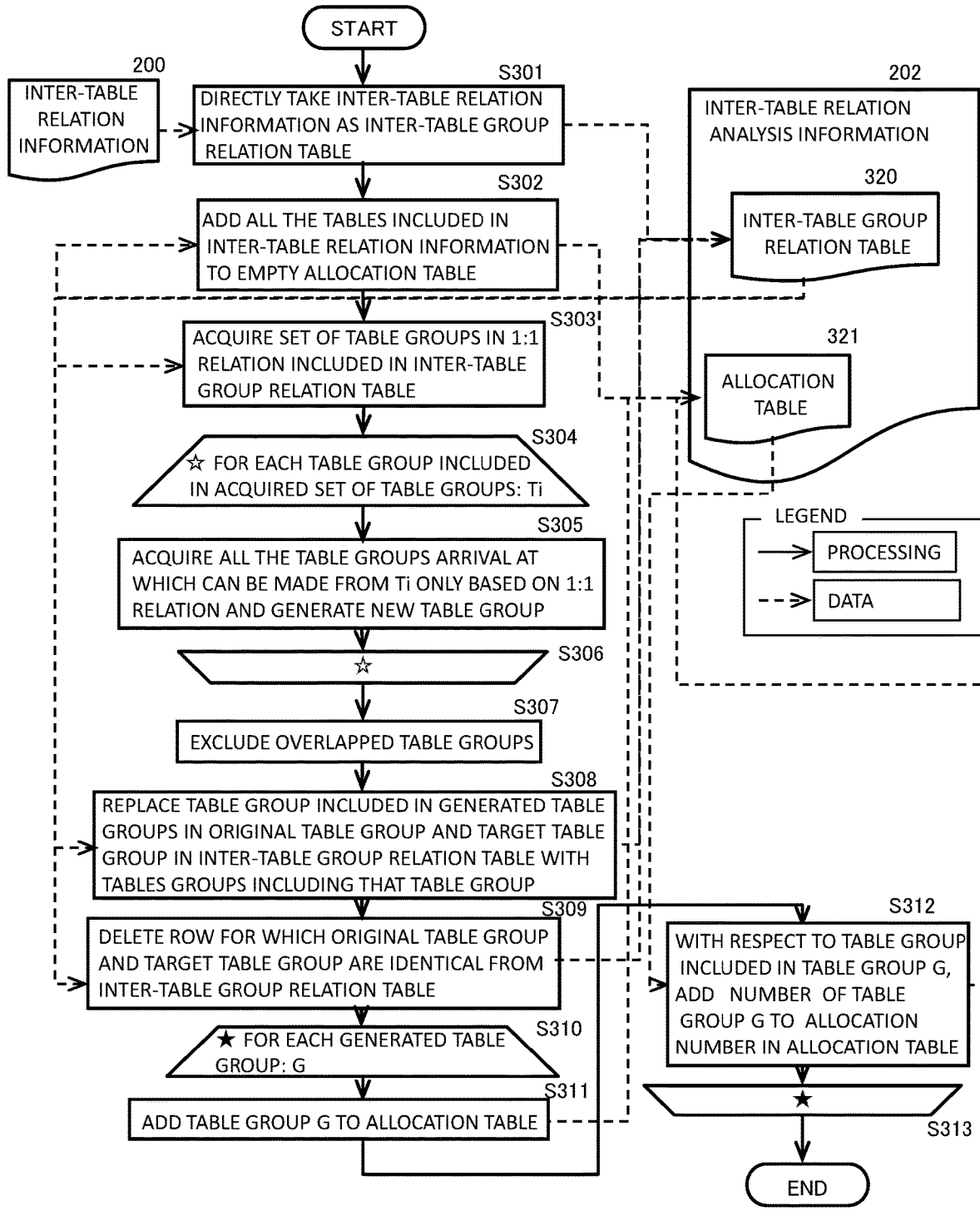
FIG. 3 is a flowchart illustrating processing of a one to one relation folding unit 201.

A description will be given to each processing in the table relation analysis assisting apparatus with reference to FIG. 3 and FIG. 4.

In the first embodiment of the table relation analysis assisting apparatus 100, the one to one relation folding unit 201, the plural to one relation folding unit 203, and the analysis result display unit 204 are invoked in this order.

First, a description will be given to processing of the one to one relation folding unit 201 with reference to FIG. 3.

First, the one to one relation folding unit 201 acquires the inter-table relation information 200 as an input and considers each table as a table group comprised of one table to generate the inter-table group relation table 320 (S301).

Subsequently, all the table groups included in the inter-table group relation table 320 are added to the empty allocation table 321 (S302). At this time, the allocation number 702 is established so that an unallocated state is identifiable. (In this embodiment, a blank is used for this purpose. A concrete example will be described later.)

Subsequently, the inter-table group relation table 320 is used as an input and a set of table groups in which a relation between table groups is a one to one relation is acquired (S303).

Thereafter, the processing of S304 to S306 sandwiched between open starts is repeated on all the table groups included in the set of table groups acquired at S303.

For each table group Ti in a one to one relation included in the acquired set of table groups (S304), all the table groups arrival at which can be made from Ti only based on the one to one relation are acquired and a new table group is generated (S305). To acquire table groups arrival at which can be made from a table group of interest only based on a one to one relation, a publicly known algorism can be adopted.

Subsequently, an overlapped table group is excluded from a plurality of the new table groups generated at S305 (S307).

Subsequently, the inter-table group relation table 320 and the new table groups left after the processing of S307 are used as a new input and the inter-table group relation table 320 is updated (S308). At S308, a table groups including a table included in the new table groups left after the processing of S307 in the original table group 601 and the target table group 602 in the inter-table group relation table 320 are replaced with the new table groups including that table left after the processing of S307.

Subsequently, a row for which the original table group 601 and the target table group 602 are identical with each other in the inter-table group relation table 320 is deleted and the inter-table group relation table 320 is updated (S309).

Subsequently, the processing of S310 to S313 sandwiched between solid starts is repeated on the new table groups left after the processing of S307.

For each generated table group G (S310), the generated table group G is numbered for ID 700 and then added to the allocation table 321 (S311). With respect to the table group included in the table groups on which attention is focused at S310, the ID 700 given at S311 is filled in the allocation number 702 of the allocation table 321 and the allocation table 321 is updated (S312).

A description will be given to processing of the plural to one relation folding unit 203 with reference to FIG. 4.

The processing of S401 to S412 sandwiched between solid diamonds is repeated as long as there is a one to plural relation in the relation 603 in the inter-table group relation table 320.

A table group included in the original table group 601 is acquired from the inter-table group relation table 320 (S402).

Thereafter, the processing of S403 to S411 sandwiched between open stars is repeated on the table group Ts acquired at S402.

Rows for which the table group acquired at S403 is included in the original table group 601 are acquired from the inter-table group relation table 320 and it is determined whether all the relations 603 are one to one or one to plural (S404).

When all the relations 603 are one to one or one to plural (S404: YES), the processing of S405 is executed and when not (S404: NO), the processing of S411 is executed.

Thereafter, the processing of S405 to S410 sandwiched between solid stars is repeated with respect to the target table group 602Td of rows for which the original table group 601 in the inter-table group relation table 320 is the table group Ts acquired at S403.

First, the inter-table group relation table 320 is updated (S406). At S406, the table group Td acquired at S405 is taken as a representative table group and a new table group including the table group Ts acquired at S403 is generated. Of the table groups included in the original table group 601 and the target table group 602 in the inter-table group relation table 320, a table group on which attention is focused at S405 is replaced with a new table group G.

Subsequently, rows for which the original table group 601 is the table group Ts acquired at S403 and rows for which the original table group 601 and the target table group 602 have an identical table group are deleted from the inter-table group relation table 320 and the inter-table group relation table 320 is updated (S407).

Subsequently, the table group G newly generated at S406 is numbered for ID 700 and added to the allocation table 321 and the allocation table 321 is updated (S408).

Subsequently, with respect to the table group included in the table group G newly generated at S406, the ID 700 given at S408 is added to the allocation number 702 in the allocation table 321 and the allocation table 321 is updated (S409).

A description will be given to operation of the table relation analysis assisting apparatus 100 based on concrete examples with reference to FIG. 5 to FIG. 18C.

Hereafter, a description will be given to operation from a step at which the table relation analysis assisting apparatus 100 analyzes a relation between tables having the correspondence shown in the diagram in FIG. 5 to a step at which the table relation analysis assisting apparatus 100 displays an analysis result in a user viewable form.

Tables will be represented in a square whose left side and upper side are emphasized by a line as shown as table A 500 to table G 506. A line segment indicates that a relation between tables or table groups is one to one and an arrow indicates that a relation between tables or table groups is plural to one. Here, the base of each arrow is equivalent to "plural," and the point of each arrow is equivalent to "one." That is, a plural to one relation means that in a table at the base of an arrow, there are a plurality of pieces of data associated to one piece of data included in a table at the point of the arrow with respect to a certain column.

A description will be given to operation of the one to one relation folding unit 201 in this example with reference to FIG. 6 to FIG. 10.

The table relation shown in FIG. 5 is expressed as in the inter-table group relation table 320 in FIG. 6. The inter-table group relation table 320 is comprised of columns of ID 600, original table group 601, target table group 602, and relation 603. This inter-table group relation table 320 is referred to at S301 of FIG. 3.

The ID 600 in the inter-table group relation table 320 is a number for identifying each row. The original table group 601 indicates a table group that is a starting point of relation 603. The target table group 602 indicates a table group as an object of relation 603. Here, the names of some columns are table group but a table is considered as one table group and can be filled in these columns. The relation 603 indicates a relation to a target table group 602 as viewed from an original table group 601, that is, any relation of one to one, one to plural, plural to one, and plural to plural.

The allocation table 321 is a worktable used to compile a table relation in terms of table groups and is comprised of columns of ID 700, table group 701, and allocation number 702 as shown in FIG. 7.

The ID 700 is a row number for identifying each row. The table group 701 indicates a table group (or a table) to be consolidated. The allocation number 702 indicates whether a table group of a row in question is included in (allocated to) any other table group 701. When a table group is included in any other table group 701, the ID 700 of a table group 701 including that table group 701 is filled in the allocation number 702. One table group (or one table) may be included in a plurality of table groups 701. At the initial point of time at S302, with respect to a value to be stored in the table group 701, a table in the table relation shown in FIG. 5 is stored and the allocation number 702 is blank.

At S303, rows whose ID 600 is "1," "2," "7," or "8" and for which the relation 603 is one to one are acquired from the inter-table group relation table 320. Thereafter, the processing of S304 to S306 is repeated on table A, table B, table D, and table F. For example, when table A is to be processed, at S305, table B is applicable to a table group (table) at which arrival can be made only based on a one to one relation; therefore, a new table group A-B is generated. Here, it will be defined that table group T1-T2 represents a table group comprised of table T1 and table T2 that are respectively in a one to one relation.

In this embodiment, a representative table group of the new table group A-B includes both table A and table B but a table group including only either of them may be taken as a representative table. An example will be taken up. When table A and table B are compared with each other, it can be seen that table group B has a relation 603 with a table group other than table group A-B. Therefore, a table group including only table B may be taken as a representative table group. By repeating the processing of S304 to S306, two table groups A-B and two table groups D-F are obtained as new table groups. At S307, thereafter, duplication is excluded and one table group A-B and one table group D-F are obtained. At S308, among the table groups included in the original table group 601 and the target table group 602 in the inter-table group relation table 320, table group A and table group B that are table groups included in the newly generated table group A-B and table group D-F are replaced with table group A-B and table group D and table group F are replaced with table group D-F.

The inter-table group relation table 320 obtained after the execution of the processing of S308 is expressed as shown in FIG. 8. At S309, the rows indicated by strikethrough in the inter-table group relation table 320 in FIG. 8 are deleted.

The processing of S310 to S313 is repeated on table group A-B and table group D-F newly generated at S305. At S311, a table group on which attention is focused at S310 is numbered for ID 700 and added to the allocation table 321. At S312, the allocation number 702 in the allocation table 321 is updated. Table groups 701 to be updated are table A, table B, table D, and table F included in table group A-B and table group D-F newly generated at S305 and a number to be filled in the allocation number 702 is ID 700 of table group A-B or table group D-F.

The relation between tables at the completion of operation of the one to one relation folding unit 201 in this example is expressed as shown in FIG. 9. It will be defined that the square with rounded corners newly introduced in FIG. 9 indicates a table group. Table group A-B 900 and table group D-F 901 are table groups newly generated at S305.

The inter-table group relation table 320 at the completion of operation of the one to one relation folding unit 201 in this example is expressed as shown in FIG. 10. In this inter-table group relation table 320, the columns for values of table A and table B and the columns for values of table D and table F disappear and table group A-B and table group D-F newly appear. In FIG. 10, the underlined bold characters indicate a one to plural relation and indicate that there are entries of a reflective plural to one relation. For example, the entry whose ID is 6, the entry whose ID is 5, the entry whose ID is 9, and the entry whose ID 10 are in a reflective relation.

The allocation table 321 at the completion of operation of the one to one relation folding unit 201 in this example is expressed as shown in FIG. 11. In comparison with FIG. 7, table group A-B (ID 700 is "8") and table group D-F (ID 700 is "9") are added; and "8" is filled in the allocation number 702 for table A (ID 700 is "1") and table B (ID 700 is "2") and "9" is filled in the allocation number 702 for table D (ID 700 is "4") and table F (ID 700 is "6").

A description will be given to operation of the plural to one relation folding unit 203 in this example with reference to FIG. 12 to FIG. 17.

At the start of operation of the plural to one relation folding unit 203, the inter-table group relation table 320 corresponds to FIG. 10 at the completion of operation of the one to one relation folding unit 201; and the allocation table 321 is as shown in FIG. 11.

The processing of S401 to S412 is repeated until there is not one to plural in the relation 603 in the inter-table group relation table 320 anymore. The inter-table group relation table in FIG. 10 includes a one to plural relation (underlined bold characters in FIG. 10).

In the processing of S402, the inter-table group relation table 320 is used as an input and a table group included in the original table group 601 is acquired. In this example, table group A-B, table C, table group D-F, table E, and table G are acquired. Then, the processing of S403 to S411 is repeated on the table groups acquired at S402. In the processing of S404, all the relations in which the original table group 601 in the inter-table group relation table 320 includes the table groups acquired at S403 are acquired and it is evaluated whether all of them are in a one to one or one to plural relation. In this example, table group D-F and table G both have only a one to plural relation. With respect to rows for which the original table group 601 in the inter-table group relation table 320 includes table group D-F, the processing of S405 to S410 is repeated on the target table group 602. In this example, table group C and table group E are applicable thereto. In the case of table group C to be processed, in the processing of S406, table C is taken as a representative table group and table group C:D-F including table group D-F is generated. Here, it is defined that TA:TB indicates a table group obtained by consolidating table group (or table) TA and table group (or table) TB in a plural to one relation.

Table group C in the original table group 601 and the target table group 602 in the inter-table group relation table 320 is replaced with table group C:D-F. In the case of table group E to be processed, at S406, table group E is taken as a representative table group and table group E:D-F,G including table group D-F and table group G is generated. Here, a notation of TA:TB,TC indicates a combination of TA:TB and TA:TC with respect to table group (or table) TA, table group (or table) TB, and table group (or table) TC.

Table group E in the original table group 601 and the target table group 602 in the inter-table group relation table 320 is replaced with table group E:D-F,G.

The inter-table group relation table 320 as the target of deletion at S407 is expressed as shown in FIG. 12. At S407, a row (strikethrough in FIG. 12) for which the original table group 601 is table group D-F or table group G and a row (underlined bold characters in FIG. 12) for which the original table group 601 and the target table group 602 have an identical table group are deleted from the inter-table group relation table 320. In the processing of S408, the table groups (table group C:D-F and table group E:D-F,G) generated at S406 are numbered for ID 700 and added to the allocation table 321. In the case of table group C:D-F, in the processing of S409, "10" is added to the allocation number 702 of table group D-F (ID 700 is "9") and "10" is added to the allocation number 702 of table group C (ID 700 is "3"). In the case of table group E:D-F,G, at S409, "11" is added to the allocation number 702 of table group D-F (ID 700 is "9") and "11" is added to the allocation number 702 of table group E (ID 700 is "5").

After the completion of one cycle of processing of S401 to S412, the inter-table group relation table 320 is expressed as shown in FIG. 13.

After the completion of one cycle of processing of S401 to S412, the allocation table 321 is expressed as shown in FIG. 14.

After the completion of one cycle of processing of S401 to S412, a relation between tables is as shown in FIG. 15. For display, a table group for which the allocation number 702 in the allocation table 321 is blank is taken as being to be displayed and utilizing the relation 603 in the inter-table group relation table 320, a line is drawn to indicate relations between tables and between table groups. In FIG. 15, the dotted-lined rectangle 1500 indicates a table group that shares an identical table or table group. In this example, table group C:D-F (1501) and table group E:D-F,G (1502) share table group D-F.

Figure 4:
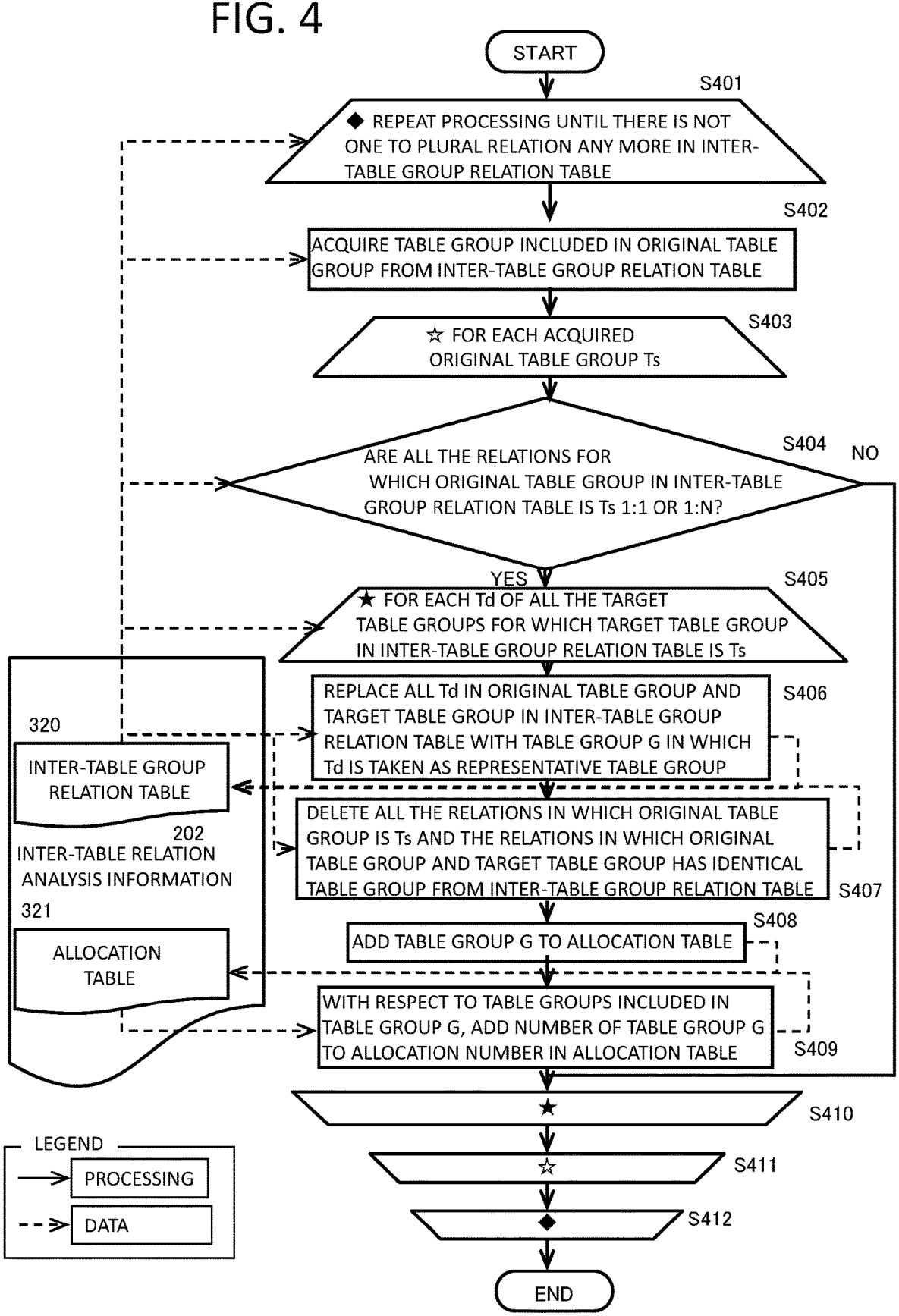
FIG. 4 is a flowchart illustrating processing of a plural to one relation folding unit 203.

In the processing shown in FIG. 4, when one cycle of processing of S401 to S412 is completed, the process returns to S401 and enters a second loop.

After the completion of two cycles of processing of S401 to S412, a relation between tables is as shown in FIG. 16. The allocation table 321 obtained at this time is as shown in FIG. 17. When the processing of S401 to S412 has been completed twice, in the inter-table group relation table 320, all the rows are deleted and the table is empty.

Thereafter, the process returns to S401. Since the inter-table group relation table 320 is empty and there is not a one to one or one to plural relation, the process proceeds to S413 and the processing of the plural to one relation folding unit 203 is terminated.

A description will be given to display screens for a result of analysis by the table relation analysis assisting apparatus with reference to FIGS. 18A to 18C.

The screen 1800 with no table group selected is as shown in FIG. 18A.

The screen 1800 with no table group selected shown in FIG. 18A displays the inter-table relation information 200 and the inter-table relation analysis information 202 as in an initial state after an analysis is completed in the above-mentioned example.

The display screen for a result of analysis is so designed that one or more displayed table groups can be selected. For example, in cases where table group A-B:C,D-F (1601) is selected, a display is provided as shown as the screen 1801 with table group A-B:C,D-F selected shown in FIG. 18B. In cases where table group E:D-F,G (1602) is selected, a display is provided as shown as the screen 1802 with table group E:D-F,G selected shown in FIG. 18C.

A description will be given to the details of a display with a case where table group A-B:C,D-F is selected taken as an example. The selected table group A-B:C,D-F includes table A 500 to table D 503 and table F 505. These tables are displayed and based on the inter-table relation information 200, a line is drawn between tables to indicate a relation between the tables. Other table groups than the selected table group are also displayed. Further, in cases where each displayed table is included in any other table group, a line is drawn between the table and the table group to indicate a sharing relation of the tables. In addition, a display may be provided so that a table included in table group A-B as a representative table group of the selected table group A-B:C,D-F can be recognized (underlined bold characters in the drawing). This is an effective operation to take, for example, when attention is focused on table A and a structure thereof is examined.

In addition, the analysis result display unit 204 may be so configured that a user's operation or information about a relation between tables is inputted and generation of a new table group, division of an existing table group, and the like can be implemented. Or, the analysis result display unit 204 may have a function of using a user's operation or information about a table as an input and discriminately displaying a table or a table group including that table. An example of the former is a method in which information about time-series updating order of tables is inputted to divide an existing table group and a table different in updating timing is excluded from the table group. An example of the latter is a method in which information about a master table/transaction table of tables is used as an input and a master table is displayed in a different color or separated from a group for display. This makes it possible to first understand information about a master table, which does not involve variation in data so much and is easily understandable, and then grasp its relation with a transaction table.

Further, the analysis result display unit 204 may have a function of displaying an execution process of each function of the one to one relation folding unit 201, the plural to one relation folding unit 203, and the like. For example, in the screen 1801 with table group A-B:C,D-F selected shown in FIG. 18B, the following measure may be taken: as a result of the execution of operation of the one to one relation folding unit 201, table A and table B and table D and table F are consolidated and respectively displayed as table group A-B and table group D-F. This makes it possible to reduce tables and table groups to be understood better and thus easily understand a table relation. In addition, the analysis result display unit 204 may have a function of using a relation between tables other than cardinality information as an input and understandably displaying the relation. For example, a rate of duplication of data equivalent to FK between tables can be used as an input and the thickness of a line indicating the relation 603 can be varied according to the rate. This makes it possible to easily understand an equivalent/subordinate relation between the tables and the like.

The method described in relation to this embodiment does not properly work when there is a plural to plural relation in relations between tables or when there is a closed loop comprised of a plural to one relation. However, in general, relational databases are so designed that there is no plural to plural relation by normalization. Similarly, a closed loop comprised of a plural to one relation is often eliminated by normalization. Therefore, the method is sufficiently practical.

As mentioned above, in this embodiment, a table relation in a relational database is analyzed from a view point of whether tables are in a one to one or one to plural relation and such a screen as shown in FIG. 18A is displayed. A user clicks an icon of a table group including a table on which the user focuses attention and a structure of which the user desires to examine. Thus, the user can view a screen showing a developed structure in detail as shown in FIG. 18B and FIG. 18C. This is especially effective to quickly analyze a structure of a large-scale database involving a complicated table relation and intuitively and easily grasp the relation.

As mentioned up to this point, this embodiment focuses attention on the fact that when there are a plurality of pieces of data associated with data on which attention is focused to understand a data relation, it is difficult to understand the relation. To cope with this, in this embodiment, a set (table group) of tables including pieces of data in one to one and plural to one relations among one to one, one to plural, plural to one, and plural to plural relations is generated. A relation between associated pieces of data is thereby visually understandably displayed to facilitate understanding of relations within a table group.

Since relations on which attention should be focused at a time can be reduced by generating a table group, a structure of a database, that is, relations between a table and a table group and between table groups can be easily grasped.

Second Embodiment

Hereafter, a description will be given to a second embodiment of the present invention with reference to FIG. 20 to FIG. 41.

The table relation analysis assisting method described in relation to the first embodiment is applied when there are one to one, one to plural, and plural to one relations between tables. A description has not been given to a case where there is a plural to plural relation or a case where there is a closed loop comprised of a plural to one relation.

In addition to the pattern in the first embodiment, this embodiment is applied to cases where there is a plural to plural relation or cases where there is a closed loop comprised of a plural to one relation.

In the description of the first embodiment, information about a relation between tables shown in FIG. 5 is externally supplied. With respect to this embodiment, a description will also be given to a function of finding a relation between tables from tables in a database to be analyzed.

With respect to this embodiment, a description will be given mainly to a difference from the first embodiment.

Figure 19:
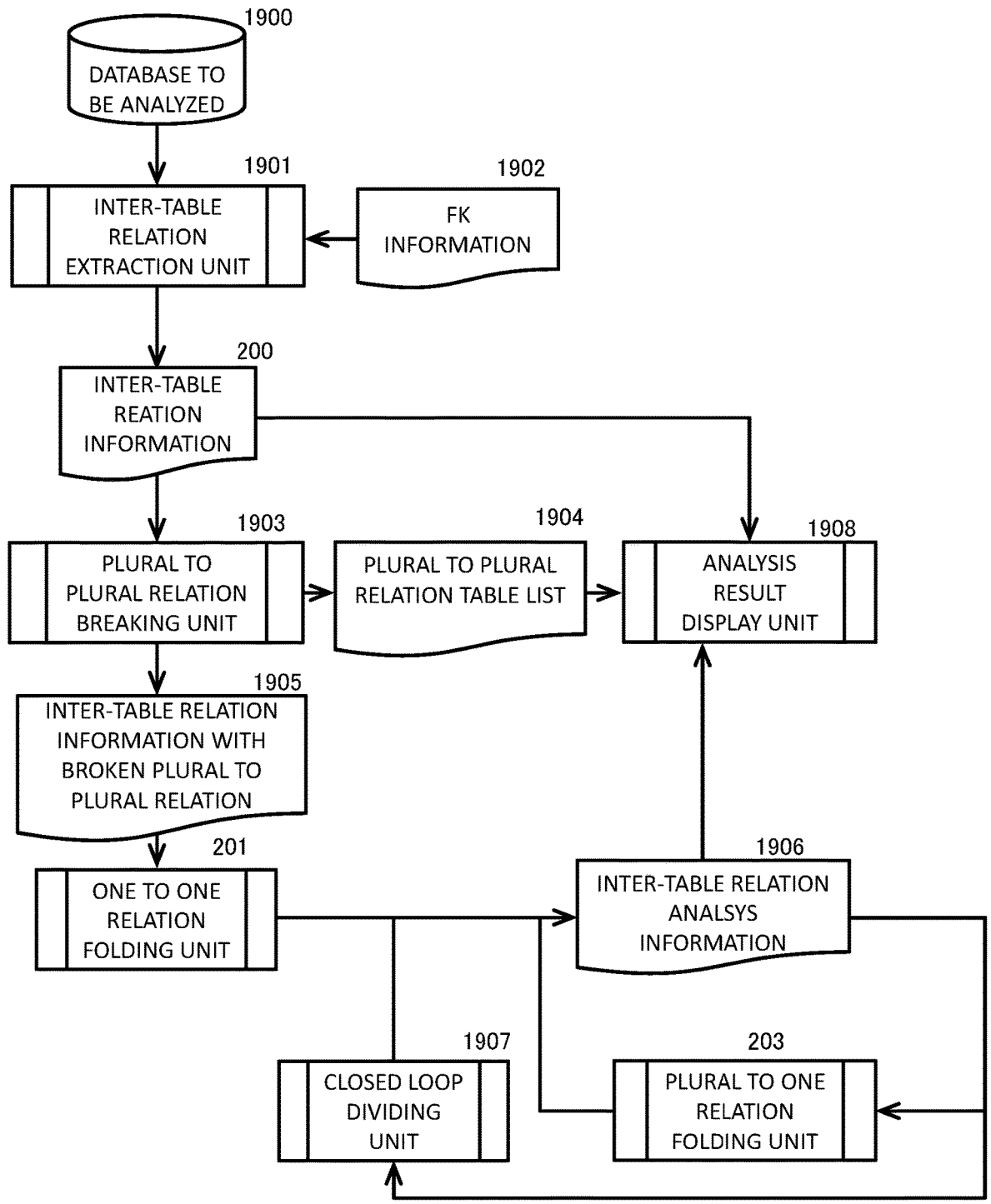
FIG. 19 is a drawing illustrating a functional configuration of a table relation analysis assisting apparatus in a second embodiment.
Figure 20:
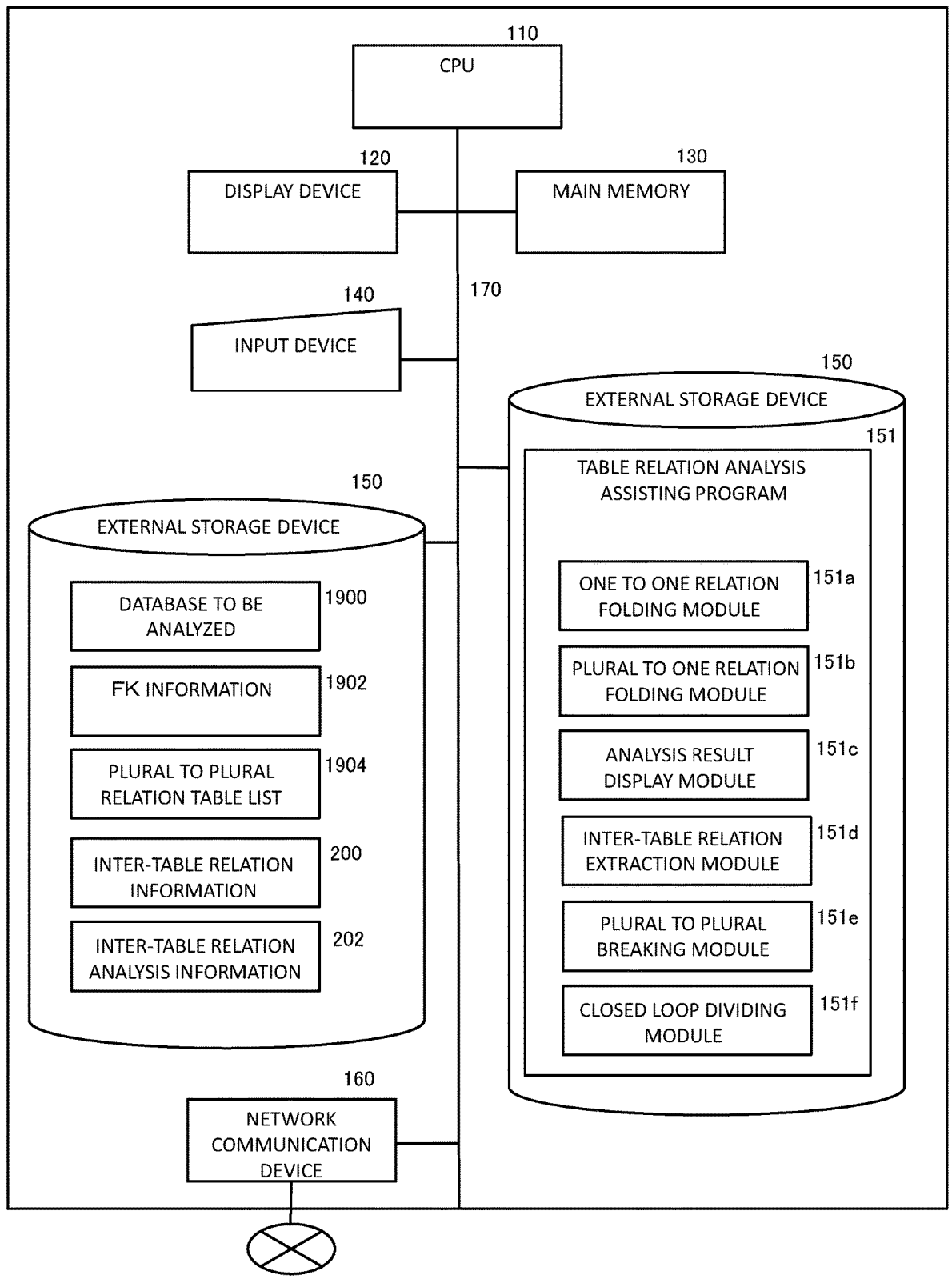
FIG. 20 is a drawing illustrating a hardware and software configuration of a table relation analysis assisting apparatus in the second embodiment.

First, a description will be given to a configuration of a table relation analysis assisting apparatus in the second embodiment with reference to FIG. 19 and FIG. 20.

In addition to the functional configuration of the first embodiment shown in FIG. 1, the functional configuration of the table relation analysis assisting apparatus 100 in this embodiment includes an inter-table relation extraction unit 1901, a plural to plural relation breaking unit 1903, and a closed loop dividing unit 1907.

The inter-table relation extraction unit 1901 uses FK information 1902 as an input, analyzes a database 1900 to be analyzed, and outputs inter-table relation information 200. The FK information 1902 includes at least information about an external key present between tables contained in the database 1900 to be analyzed. It is assumed that the database 1900 to be analyzed is a relational database; however, any set of pieces of data for which a limitation similar to an external key can be defined can be handled with the table relation analysis assisting apparatus in this embodiment. The plural to plural relation breaking unit 1903 uses the inter-table relation information 200 as an input and outputs a plural to plural relation table list 1904 and inter-table relation information with a broken plural to plural relation 1905. The plural to plural relation table list 1904 records at least a set of tables having a plural to plural relation in the inter-table relation information 200. The inter-table relation information with a broken plural to plural relation 1905 is obtained by excluding a row for which the relation 603 is plural to plural from the inter-table relation information 200. Inter-table relation analysis information 1906 is obtained by adding a closed loop share number (described later) to the allocation table 321 in the inter-table relation analysis information 202. The closed loop dividing unit 1907 removes a closed loop comprised of a plural to one relation included in the inter-table relation analysis information 1906 and updates the inter-table relation analysis information 1906. An analysis result display unit 1908 has a function of understandably displaying a plural to plural relation in addition to the functionality of the analysis result display unit 204 in the first embodiment.

In addition to the modules installed in the table relation analysis assisting apparatus 100 in the first embodiment, the table relation analysis assisting apparatus 100 in this embodiment has an inter-table relation extraction module 151d, a plural to plural relation breaking module 151e, and a closed loop dividing module 151f installed in an external storage device 150. The inter-table relation extraction module 151d, the plural to plural relation breaking module 151e, and the closed loop dividing module 151f are modules respectively executing the functions of the inter-table relation extraction unit 1901, the plural to plural relation breaking unit 1903, and the closed loop dividing unit 1907. As in the first embodiment, the table relation analysis assisting apparatus 100 executes these modules loaded from the external storage device 150 into the main memory 130 by the CPU 110.

In addition to the data stored in the table relation analysis assisting apparatus 100 in the first embodiment, the table relation analysis assisting apparatus 100 in this embodiment has the database 1900 to be analyzed, the FK information 1902, the plural to plural relation table list 1904, and the inter-table relation information with a broken plural to plural relation 1905 stored as data in an external storage device 150.

Figure 21:
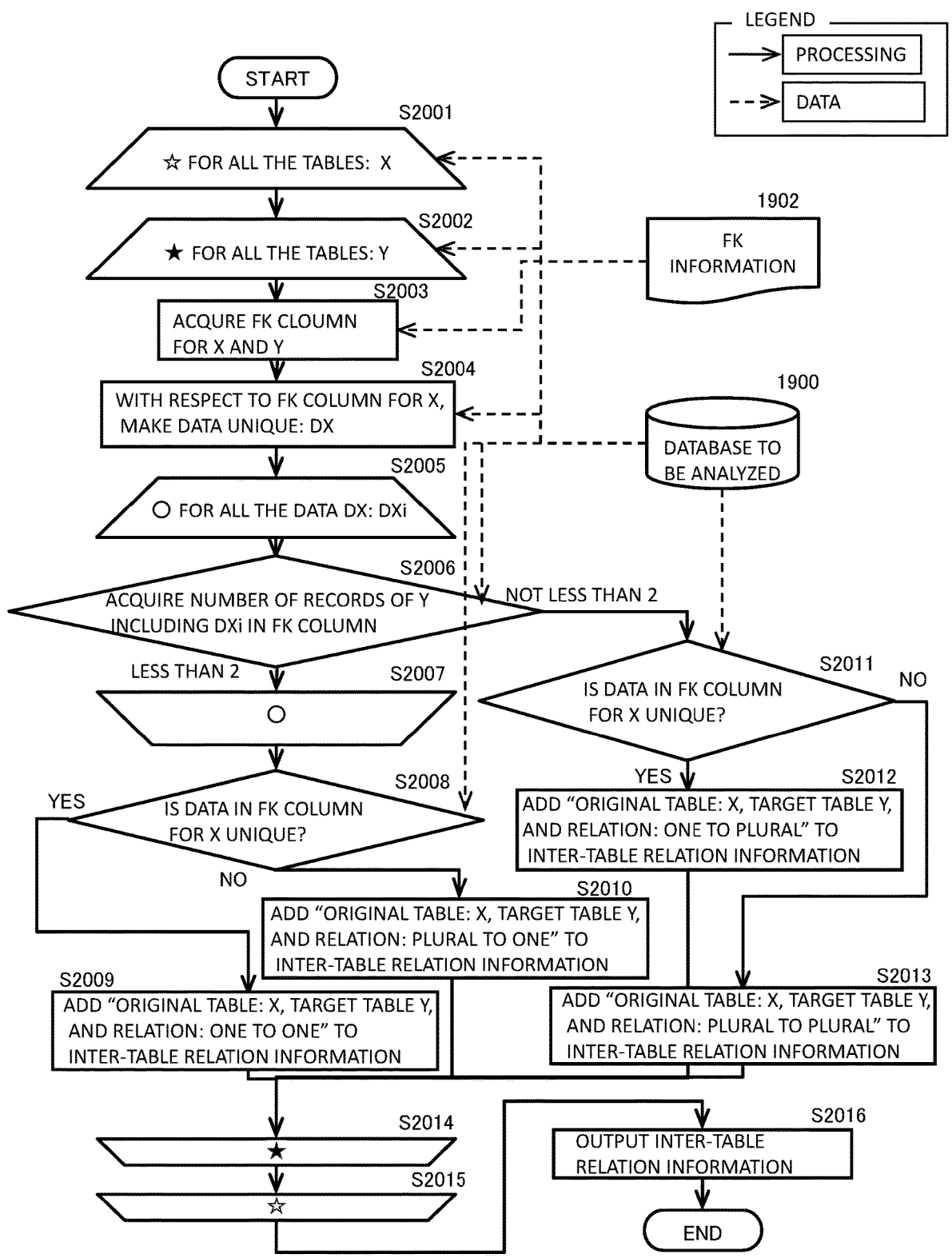
FIG. 21 is a flowchart illustrating processing of an inter-table relation extraction unit 1901.

A description will be given to processing of the inter-table relation extraction unit 1901 with reference to FIG. 21.

The inter-table relation extraction unit 1901 entirely repeats processing of S2001 to S2015 sandwiched between open stars and solid stars on all the pairs of tables included in the database 1900 to be analyzed. Hereafter, a table on which attention is focused at S2001 in the loop sandwiched between open stars will be referred to as table X and a table on which attention is focused at S2002 in the loop sandwiched between solid stars will be referred to as table Y.

First, an external key defined between table X and table Y is acquired from the FK information 1902 (S2003). Hereafter, an external key on the table X side will be represented as FKx and an external key on the table Y side will be represented as FKy.

Subsequently, all the pieces of FKx data are acquired from the database 1900 to be analyzed and duplication is excluded to obtain a set of pieces of unique data DX (S2004). Then the processing of S2005 to S2007 sandwiched between open circles is repeated on all the pieces of unique data DX acquired at S2004.

First, the number of pieces of FKy data corresponding to data on which attention is focused at S2005 is acquired and the number of pieces of the data is determined (S2006). When the number is less than 2 (S2006: LESS THAN 2), the process proceeds to S2007; when the number is 2 or above (S2006: NOT LESS THAN 2), the process proceeds to S2011.

Subsequently, it is determined whether FXx data includes duplication (S2008). When the data does not include duplication (S2008: YES), the process proceeds to S2009; when the data includes duplication (S2008: NO), the process proceeds to S2010.

Subsequently, it is determined whether the FXx data includes duplication (S2011). When the data does not include duplication (S2011: YES), the process proceeds to S2012; when the data includes duplication (S2011: NO), the process proceeds to S2013.

When the determination at S2008 is YES, a row for which the original table is X, the target table is Y, and the relation is one to one is added to the inter-table relation information 200 to be outputted (S2009).

When the determination at S2008 is NO, a row for which the original table is X, the target table is Y, the relation is plural to one is added to the inter-table relation information 200 to be outputted (S2010).

When the determination at S2011 is YES, a row for which the original table is X, the target table is Y, and the relation is one to plural is added to the inter-table relation information 200 to be outputted (S2012).

When the determination at S2011 is NO, a row for which the original table is X, the target table is Y, and the relation is plural to plural is added to the inter-table relation information 200 to be outputted (S2013).

When the process exits from the loop of processing of S2001 to S2015 sandwiched between open stars and solid stars, the inter-table relation extraction unit 1901 outputs the inter-table relation information 200 (S2016).

Figure 22:
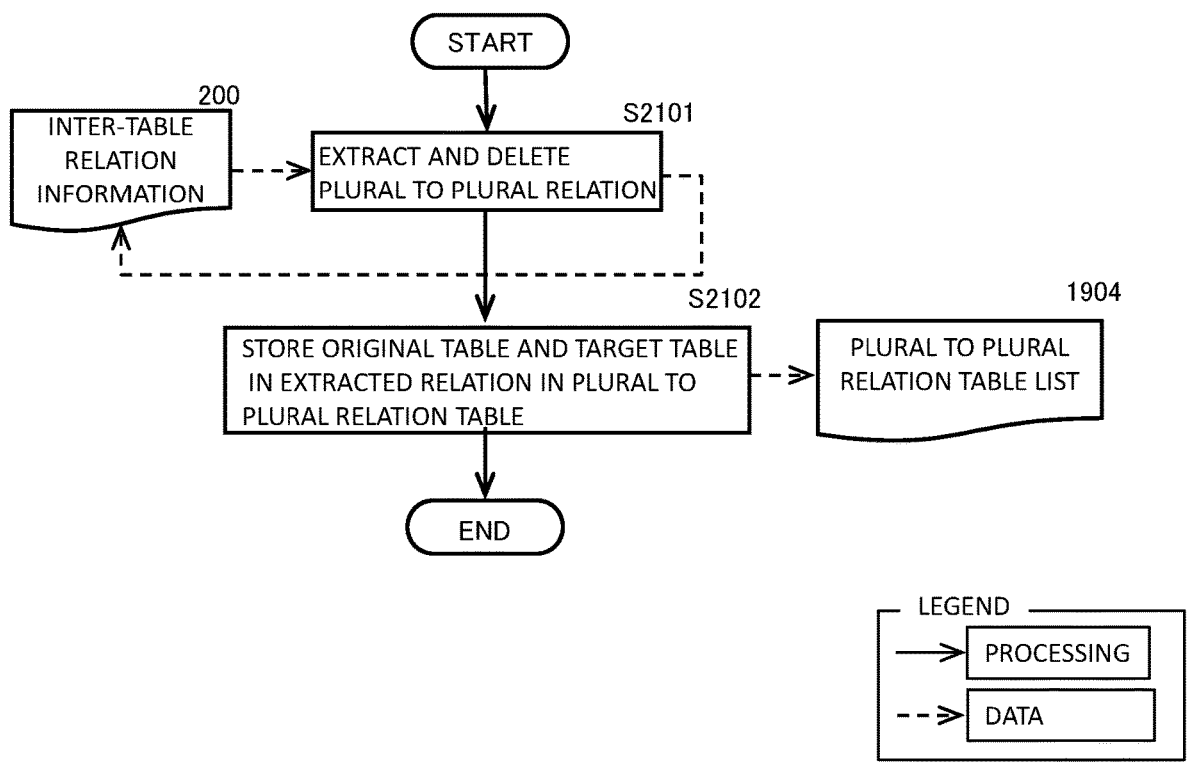
FIG. 22 is a flowchart illustrating processing of a plural to plural relation breaking unit 1903.

A description will be given to processing of the plural to plural relation breaking unit 1903 with reference to FIG. 22.

First, the plural to plural relation breaking unit 1903 extracts and deletes a row for which the relation is plural to plural from the inter-table relation information 200 (S2101).

Subsequently, the original table and the target table for the row extracted at S2101 are added to the plural to plural relation table list 1904 (S2102).

A description will be given to processing of the closed loop dividing unit 1907 with reference to FIG. 23.

First, a closed loop that is comprised of a plural to one relation and does not include two or more identical table groups is extracted from the inter-table group relation table 320 (S2201). To extract a closed loop, a publicly known algorism can be utilized.

Subsequently, all the table groups constituting the closed loop acquired at S2201 are acquired (S2202). The processing of S2203 to S2208 sandwiched between open starts is repeated on the table groups Tc acquired at S2202.

First, closed loops including the table groups Tc on which attention is focused at S2203 are extracted from the closed loops acquired at S2201 and each closed loop is taken as a new table group (S2204).

Subsequently, the table groups Tc acquired at S2202, included in the original table group 601 and the target table group 602 in the inter-table group relation table 320, are replaced with the new table groups generated at S2204 (S2205).

Subsequently, when the new table groups generated at S2204 are not included in the allocation table 2212, the new table groups are numbered for ID 700 and added thereto (S2206).

With respect to the table groups included in the closed loops, the ID 700 of corresponding table groups given at S2206, if not duplicated, are filled in the allocation number 702 in the allocation table 2212 (S2207).

Subsequently, with respect to all the table groups comprised of a closed loop, the ID 700 of the respective table groups 701 are listed in the closed loop share number 3000 of the table group 701 including identical tables (S2209).

Subsequently, a row for which the original table group 601 and the target table group 602 include one or more table groups 701 indicating identical closed loops is deleted from the inter-table group relation table 320 (S2210). The description of this embodiment does not refer to assisting an analysis of a structure within a closed loop. However, a structure within a closed loop can also be analyzed by the plural to one relation folding unit 203 or the like by breaking any relation 603 within the closed loop. At this time, the following measure can be taken in terms of breaking position: with respect to, for example, a table including only a one to plural relation, a one to plural relation constituting a closed loop is broken. This makes it possible to easily grasp a relation between a table in the closed loop and a table out of the closed loop.

A description will be given to operation of the table relation analysis assisting apparatus 100 based on a concrete example with respect to FIG. 24 to FIG. 40.

In the description of this embodiment, a relation between tables in a relational database represented in the form of diagram shown in FIG. 24 will be taken as an example.

As in the description of the first embodiment, table A 2300 to table M 2312 represent tables; a line indicates that tables or table groups are in a one to one relation; a single point arrow indicates that tables or table groups are in a plural to one relation. A double point arrow, which is a symbol newly found in the following description, indicates that tables and table groups are in a plural to plural relation.

In the example taken in the description of the second embodiment, it is assumed that table A, table C, table D, and table B as well as table A, table G, table H, table I, and table B respectively form a closed loop and that table K and table L are in a plural to plural relation.

Hereafter, a description will be given to operation of the plural to plural relation breaking unit 1903 with reference to FIG. 25 to FIG. 28.

The relation between tables shown in the form of diagram in FIG. 24 is expressed by the inter-table relation information 200 in FIG. 25. At S2101 of FIG. 22, rows (ID 2400 is "25" and "26") having a plural to plural relation are deleted from the inter-table relation information 200. At S2102, table K and table L and table L and table K that are the original table 2401 and the target table 2402 of the rows deleted at S2101 are added to the plural to plural relation table list 1904.

After the completion of operation of the plural to plural relation breaking unit 1903, the inter-table relation information with a broken plural to plural relation 1905 is as shown in FIG. 26.

After the completion of operation of the plural to plural relation breaking unit 1903, the plural to plural relation table list 1904 is as shown in FIG. 27.

Figure 28:
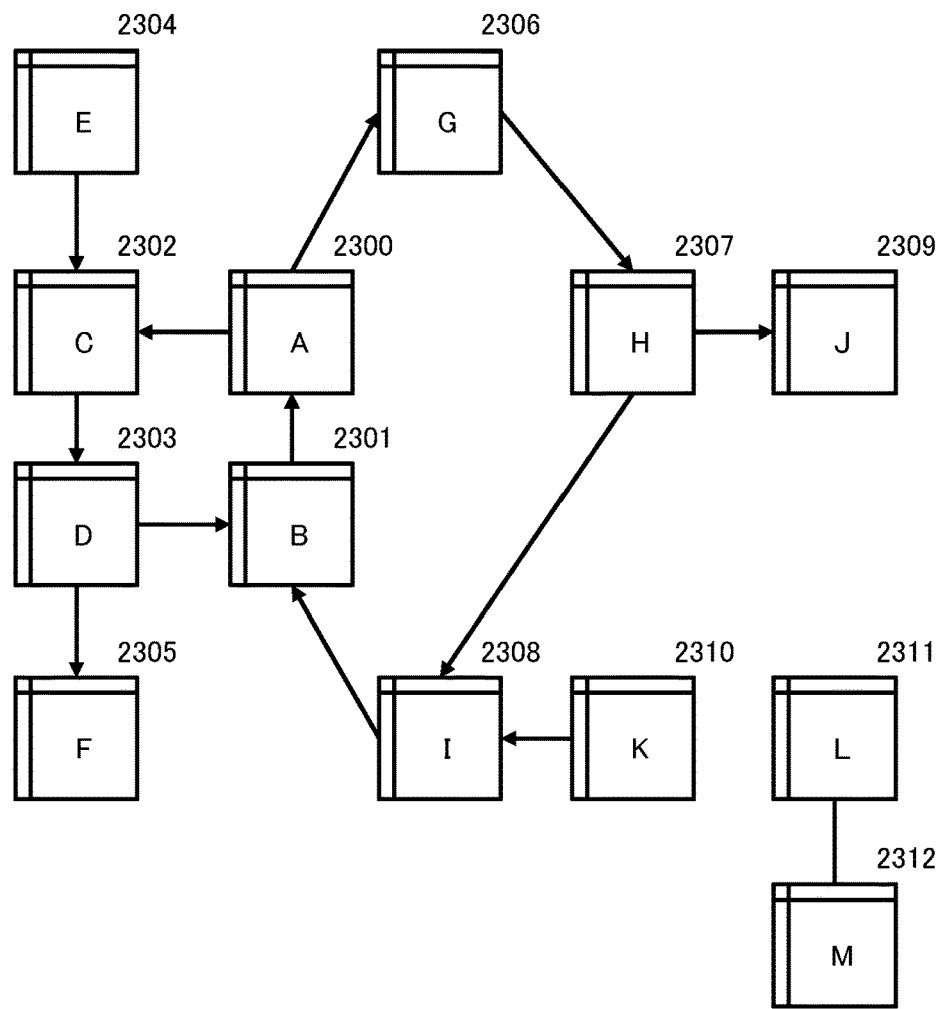
FIG. 28 is a diagram illustrating a relation between tables in a relational database in the second embodiment (#2)

After the completion of operation of the plural to plural relation breaking unit 1903, the diagram of relation between tables is as shown in FIG. 28.

A description will be given to operation of the closed loop dividing unit 1907 with reference to FIG. 29 to FIG. 35.

After the completion of operation of the plural to plural relation breaking unit 1903, the one to one relation folding unit 201 is applied. Relations between tables and a table group as an input to the closed loop dividing unit 1907 are as shown in FIG. 29. In this example, table L and table M are consolidated into table group L-M.

The inter-table group relation table 320 as an input to the closed loop dividing unit 1907 is as shown in FIG. 30. This is a table having information equivalent to the table relation information in FIG. 26.

When the allocation table 2212 as an input to the closed loop dividing unit 1907 in this example is illustrated, FIG. 30 is converted into FIG. 31.

Figure 23:
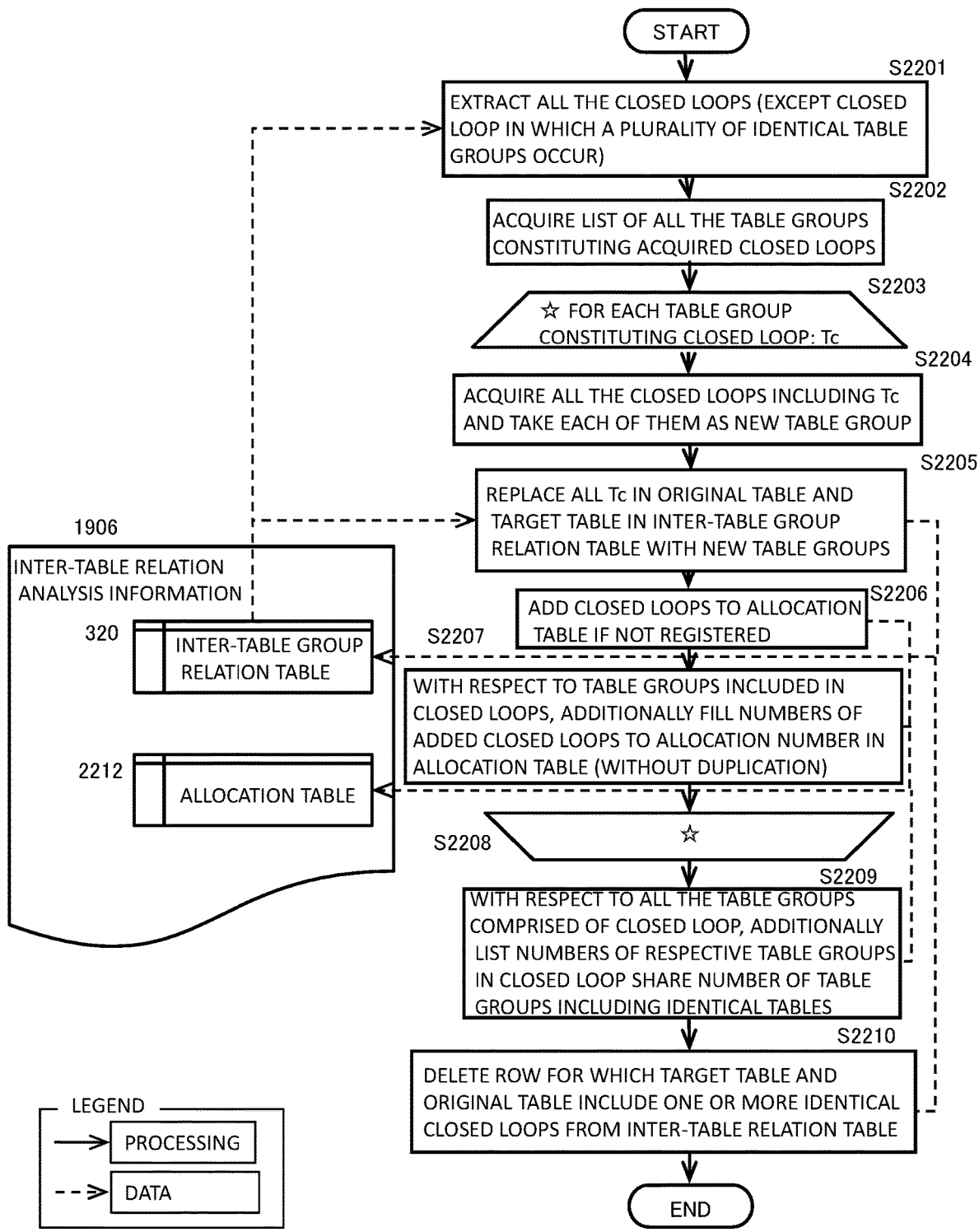
FIG. 23 is a flowchart illustrating processing of a closed loop dividing unit 1907.

At S2201 of FIG. 23, closed loop A*C*D*B and closed loop A*G*H*I*B that are closed loops comprised of a plural to one relation included in the inter-table group relation table 320 are extracted. As contrasted with table T1, table T2, ..., table Tn, T1*T2* ... *Tn means that table T1, table T2, ..., table Tn form a closed loop in a diagram.

At S2202, subsequently, table A, table B, table C, table D, table H, table I and table G constituting the closed loops acquired at S2201 are acquired. The processing of S2203 to S2208 is repeated on the tables acquired at S2202. When attention is focused on table group A at S2203, at S2204, table group A*C*D*B and table group A*G*H*I*B are generated with respect to closed loop A*C*D*B and closed loop A*G*H*I*B.

At S2205, table A, table C, table D, and table B included in the original table group 601 and the target table group 602 in the inter-table group relation table 320 are all replaced with table group A*C*D*B based on table group A*C*D*B; and table A, table G, table H, table I, and table B included in the original table group 601 and the target table group 602 in the inter-table group relation table 320 are replaced with table group A*G*H*I*B based on table group A*G*H*I*B. Since table group A and table group B are included in both the closed loops, table group A*C*D*B and table group A*G*H*I*B are listed together.

At S2206, subsequently, table group A*C*D*B and table group A*G*H*I*B are numbered for ID 700 and additionally filled in the allocation table 2212.

At S2207, subsequently, "15" that is ID 700 given at S2205 is filled in the allocation number 702 of table A, table C, table D, and table B based on table group A*C*D*B; and "16" that is ID 700 given at S2205 is filled in the allocation number 702 of table A, table G, table H, table I, and table B based on table group A*G*H*I*B. Since table group A and table group B are included in both the closed loops, respective ID 700 of table group A*C*D*B and table group A*G*H*I*B are listed together.

There are table group A and table group B shared between table group A*C*D*B and table group A*G*H*I*B indicating a closed loop. Consequently, at S2209, subsequently, "16" that is ID 700 of table group A*G*H*I*B is filled in the closed loop share number 3000 of table group A*C*D*B; and similarly, "15" that is ID 700 of table group A*C*D*B is filled in the closed loop share number 3000 of table group A*G*H*I*B.

At S2210, subsequently, a row for which the original table group 601 and the target table group 602 include one or more identical table groups is deleted from the inter-table group relation table 320.

The inter-table group relation table 320 before the execution of processing of S2210 is as shown in FIG. 33 and the rows with strikethrough are to be deleted.

The inter-table group relation table 320 after the completion of operation of the closed loop dividing unit 1907 is as shown in FIG. 34.

After the execution of operation of the closed loop dividing unit 1907, a relation between tables is as shown in FIG. 35.

After the execution of operation of the closed loop dividing unit 1907, operation of the plural to one relation folding unit 203 is performed.

At the time of completion of one cycle of processing of S401 to S412 at the plural to one relation folding unit 203, the allocation table 2212 is as shown in FIG. 36. At the time of completion of one cycle of processing of S401 to S412 at the plural to one relation folding unit 203, relations between tables and table groups are as shown in the form of diagram in FIG. 37.

At the time of completion of two cycles of processing of S401 to S412 at the plural to one relation folding unit 203, the allocation table 2212 is as shown in FIG. 38. At the time of completion of two cycles of processing of S401 to S412 at the plural to one relation folding unit 203, a relation between tables and table groups are as shown in the form of diagram in FIG. 39. Here, as contrasted with table group (or table) TA, table group (or table) TB and table group (or table) TC, the symbol of TA:TB:TC means that TA:TB and at the same time, TB: TC.

At this point of time, there has not been a row for which the relation 603 is one to one or one to plural in the inter-table group relation table 320 and the processing of the plural to one relation folding unit 203 is terminated.

A description will be given to a display screen for a result of analysis by the table relation analysis assisting apparatus in the second embodiment with reference to FIG. 40.

An example of a display screen for a result of analysis by the table relation analysis assisting apparatus in the second embodiment is as shown in FIG. 40.

Table group E:A*C*D*B (3800) indicates that table group E and table group A*C*D*B are in a plural to one relation and table A, table C, table D, and table B constitute a closed loop. Similarly, table group K:A*G*H*I*B:J (3801) indicates that table group K: and table group A*G*H*I*B and table group A*G*H*I*B and table J are in a plural to one relation and table A, table G, table H, table I, and table B constitute a closed loop.

The display screen further indicates that table group K:A*G*H*I*B:J (3801) and table group L-M (2800) are in a plural to plural relation.

Table group E:A*C*D*B (3800) and table group K:A*G*H*I*B:J (3801) share table A and table B therebetween.

Figure 41:
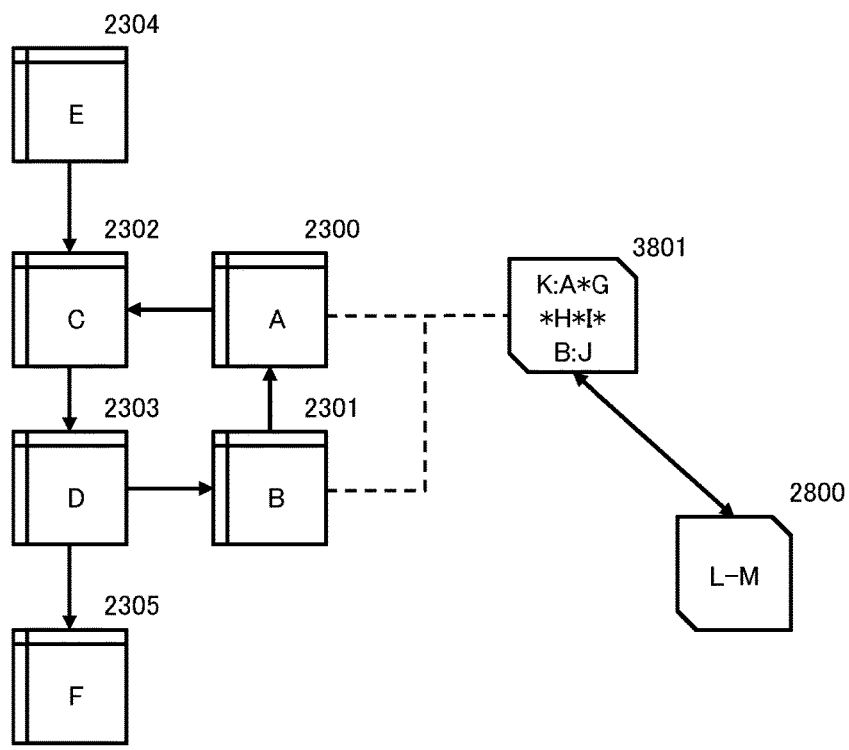
FIG. 41 is a drawing illustrating an example of a display screen for a result of analysis by a table relation analysis assisting apparatus in the second embodiment (#2)

When table group E:A*C*D*B (3800) is selected, the structure of the table group is developed and is displayed as shown in FIG. 41.

In cases where a relation between tables constitutes a closed loop in a diagram, this embodiment brings about the following advantage in addition to those of the first embodiment: even when tables have a plural to plural relation, a relation between the tables can be analyzed and displayed in a user viewable form and the present invention is effective to analyze a database having a complicated table structure.

What is claimed is:

1. A table relation analysis assisting apparatus for reducing data, analyzing a relation between pieces of data in a certain column astride tables in a relational database and improving relation determination, comprising:
   a memory, including inter-table relation analysis information for indicating:
      an inter-table relation as one of:
         a one to one relation;
         a one to plural relation; or
         a plural to one relation;
   a display; and
   a processor communicatively coupled to the memory and display, wherein the processor is configured to:
      identify and combine, based on the inter-table relation analysis information, tables having a same inter-table relation;
      provide an allocation number for each of the combined tables;
      determine, for each of a plurality of tables the data of which is the one to one relation or the plural to one relation in a table group, which of the plurality of tables are in the one to one relation,
      for each of the plurality of tables with the one to one relation, create a new combined table in the table group,
      replace each of the plurality of tables with the one to one relation in the table group with a corresponding one of the new combined table, and delete each of the plurality tables with the one to one relation in the table group,
      generate a new allocation number of each of the new combined tables,
      determine, after each of the tables with the one to one relation are deleted, which of the plurality tables in the table group are in the one to plural relation,
      create an other combined table for each of the plurality of tables in the one to plural relation, using a new table group that corresponds to a plural relation in each of the one to plural relation,
      replace each of the tables with the one to plural relation in the table group with a corresponding one of the other combined table and update a relation to the plural to one relation, and delete each of the tables with the one to plural relation in the table group,
      generate an other allocation number of each of the other combined tables,
      display, via the display, details of the inter-table relation analysis information, provide a display in such a form that one or more of the plurality tables in a relational database are contracted into the table group, and display the table group such that the one to one relation or the plural to one relation between the plurality of tables can be viewed.

2. The table relation analysis assisting apparatus according to claim 1, wherein the table group is displayed in the form of graph in which the plurality of tables are connected.

3. The table relation analysis assisting apparatus according to claim 1, further comprising a plural to plural relation breaking unit that consolidates the plurality of tables in a plural to plural relation from inter-table relation information into the table group, taking the table group out of other table groups, and updating the inter-table relation analysis information, wherein the display displays a different table group of the plurality of tables in a plural to plural relation in such a form that the different table group is separated from the other table groups.

4. The table relation analysis assisting apparatus according to claim 1, wherein the processor is further configured to, in cases where a relation between pieces of data in a certain column astride tables in the relational database is in the plural to one relation, when the plural to one relation between the plurality of tables is represented by a directional line segment and a closed loop having the plurality of tables as a node is configured, separates the plurality of tables constituting that closed loop as a different table group from other table groups and thereby updates the inter-table relation analysis information, wherein the display displays the different table group constituting the closed loop such that the different table group is separated from the other table groups.

5. The table relation analysis assisting apparatus according to claim 1, wherein when there is at least one table of the plurality of tables shared between a plurality of table groups, the display displays a sharing relation of the at least one table.

6. The table relation analysis assisting apparatus according to claim 1, wherein a certain column for which a relation between pieces of data is analyzed is an external key of the one or more tables of the relational database.

7. The table relation analysis assisting apparatus according to claim 1, wherein the processor is further configured to analyze which of the one to one relation, the plural to one relation, and a plural to plural relation a relation between pieces of data in a certain column astride tables of the plurality of tables in the relational database is and outputs updated inter-table relation information.

8. An inter-table relation analysis assisting method for reducing data, analyzing a relation between pieces of data in a certain column astride tables in a relational database and improving relation determination, comprising:

providing a table relation analysis assisting apparatus including:

a memory, including inter-table relation analysis information for indicating:

an inter-table relation as one of:
a one to one relation;
a one to plural relation; or
a plural to one relation;

a display; and a processor communicatively coupled to the memory and display, wherein the processor is configured to:
identify and combine, based on the inter-table relation analysis information, tables having a same inter-table relation, and
provide an allocation number for each of the combined tables;

determining using the inter-table relation analysis information, for each of a plurality of tables in a table group, if pieces of data in the plurality of tables is in the one to one relation or the plural to one relation;

for each of the plurality of tables with the one to one relation, creating a new combined table in the table group;

replacing each of the plurality of tables with the one to one relation in the table group with a corresponding one of the new combined table, and delete each of the plurality tables with the one to one relation in the table group, generating a new allocation number of each of the new combined tables, determining, after each of the tables with the one to one relation are deleted, which of the plurality tables in the table group are in the one to plural relation, creating an other combined table for each of the plurality of tables in the one to plural relation, using a new table group that corresponds to a plural relation in each of the one to plural relation, replacing each of the tables with the one to plural relation in the table group with a corresponding one of the other combined table and update a relation to the plural to one relation, and delete each of the tables with the one to plural relation in the table group, generating an other allocation number of each of the other combined tables, displaying, via the display, details of the inter-table relation analysis information, providing a display in such a form that one or more of the plurality of tables in a relational database are contracted into the table group; and displaying the table group such that the one to one relation or the plural to one relation between the plurality of tables can be viewed.

* * * * *